US011770582B2

(12) United States Patent
Hoffmann et al.

(10) Patent No.: US 11,770,582 B2
(45) Date of Patent: Sep. 26, 2023

(54) FRAME CONVERSION FOR ADAPTIVE STREAMING ALIGNMENT

(71) Applicants: DOLBY LABORATORIES LICENSING CORPORATION, San Francisco, CA (US); DOLBY INTERNATIONAL AB, Amsterdam (NL)

(72) Inventors: Michael Donald Hoffmann, Beaverton, OR (US); Christof Fersch, Neumarkt (DE); Marvin Pribadi, Redwood City, CA (US); Holger Hoerich, Fuerth (DE)

(73) Assignees: DOLBY LABORATORIES LICENSING CORPORATION, San Francisco, CA (US); DOLBY INTERNATIONAL AB, Dublin (IE)

( * ) Notice: Subject to any disclaimer, the term of this patent is extended or adjusted under 35 U.S.C. 154(b) by 0 days.

(21) Appl. No.: 17/825,995

(22) Filed: May 26, 2022

(65) Prior Publication Data

US 2022/0286730 A1    Sep. 8, 2022

Related U.S. Application Data

(62) Division of application No. 16/973,762, filed as application No. PCT/US2019/039535 on Jun. 27, 2019, now Pat. No. 11,368,747.
(Continued)

(30) Foreign Application Priority Data

Jun. 28, 2018   (EP) .................................... 18180389

(51) Int. Cl.
*H04N 21/435* (2011.01)
*H04N 21/2343* (2011.01)
*H04N 21/61* (2011.01)

(52) U.S. Cl.
CPC ..... *H04N 21/4355* (2013.01); *H04N 21/2343* (2013.01); *H04N 21/615* (2013.01)

(58) Field of Classification Search
CPC ........... H04N 21/4355; H04N 21/2343; H04N 21/615
See application file for complete search history.

(56) References Cited

U.S. PATENT DOCUMENTS 7,738,676 B1 *   6/2010   Evans .................... G06F 18/00
                                                                 713/176
7,983,440 B1 *   7/2011   Roberts ............ H04N 21/23892
                                                                  380/54

(Continued)

FOREIGN PATENT DOCUMENTS

EP        2843963        3/2015
JP     2004007648 A      1/2004
(Continued)

OTHER PUBLICATIONS

Deursen, Davy Van, et al "Semantic Adaptation of Synchronized Multimedia Streams in a Format-Independent Way" Picture Coding Symposium, May 6, 2009, pp. 1-4.

*Primary Examiner* — Mulugeta Mengesha

(57) ABSTRACT

Methods for generating an AV bitstream (e.g., an MPEG-2 transport stream or bitstream segment having adaptive streaming format) such that the AV bitstream includes at least one video I-frame synchronized with at least one audio I-frame, e.g., including by re-authoring at least one video or audio frame (as a re-authored I-frame or a re-authored P-frame). Typically, a segment of content of the AV bitstream which includes the re-authored frame starts with an I-frame and includes at least one subsequent P-frame. Other aspects are methods for adapting such an AV bitstream, audio/video processing units configured to perform any embodiment of the inventive method, and audio/video pro-
(Continued)

cessing units which include a buffer memory which stores at least one segment of an AV bitstream generated in accordance with any embodiment of the inventive method.

2 Claims, 5 Drawing Sheets

Related U.S. Application Data

(60) Provisional application No. 62/690,998, filed on Jun. 28, 2018.

(56) References Cited

U.S. PATENT DOCUMENTS

| | | | |
|---|---|---|---|
| 2004/0184539 A1* | 9/2004 | Lane | H04N 19/134 375/E7.181 |
| 2010/0235472 A1 | 9/2010 | Sood | |
| 2011/0169952 A1 | 7/2011 | Yamaguchi | |
| 2011/0263332 A1* | 10/2011 | Mizrachi | A63F 13/12 463/42 |
| 2013/0208811 A1 | 8/2013 | Liu | |
| 2015/0249829 A1 | 9/2015 | Koat | |
| 2015/0358622 A1 | 12/2015 | Lee | |
| 2015/0373075 A1 | 12/2015 | Perlman | |
| 2016/0142750 A1 | 5/2016 | Huber | |
| 2016/0295224 A1 | 10/2016 | Finkelstein | |
| 2016/0366452 A1 | 12/2016 | Roessler | |
| 2017/0064329 A1 | 3/2017 | Lawrence | |

FOREIGN PATENT DOCUMENTS

| | | |
|---|---|---|
| JP | 2005051307 A | 2/2005 |
| JP | 2006521064 A | 9/2006 |
| JP | 2007184913 A | 7/2007 |
| JP | 2016136256 A | 7/2016 |
| JP | 2017508375 A | 3/2017 |
| JP | 2017520954 A | 7/2017 |
| JP | 2017195755 A | 10/2017 |
| WO | 2015118164 | 8/2015 |
| WO | 2017138387 A1 | 8/2017 |

* cited by examiner

FRAME CONVERSION FOR ADAPTIVE STREAMING ALIGNMENT

CROSS-REFERENCE TO RELATED APPLICATIONS

This application a divisional of application of U.S. patent application Ser. No. 16/973,762, internationally filed on Jun. 27, 2019, which is a U.S. National Stage under U.S.C. 371 of International Patent Application No. PCT/US2019/039535, filed on Jun. 27, 2019, which claims the benefit of priority to U.S. Provisional Patent Application No. 62/690,998 and European Patent Application No. 18180389.1, both filed on 28 Jun. 2018, each of which are hereby incorporated by reference.

TECHNICAL FIELD

This document pertains to audio and video signal processing, and more particularly, to the generation and adaptation of bitstreams (e.g., bitstreams or bitstream segments used in adaptive streaming formats or methods/protocols, or transport streams) which include video frames (of encoded video data and optionally also metadata) and audio frames (of encoded audio data and optionally also metadata). Some embodiments of the invention generate or adapt (e.g., align) bitstream segments (e.g., having MPEG-2 transport stream format, or format in accordance with MMT or MPEG-DASH or another streaming method/protocol, or another adaptive streaming format, or another standard compatible format), which include encoded audio data (e.g., encoded audio data in a format compliant or compatible with the AC-4, or MPEG-D USAC, or MPEG-H Audio standard).

BACKGROUND OF THE INVENTION

In adaptive streaming, data having (or used in) an adaptive streaming format may comprise separate bitstreams (or bitstream segments) for each video representation and audio representation. Thus, the data may not consist of a single bitstream (e.g., a single transport stream), and instead may include two or more separate bitstreams. Herein, the expression "AV bitstream" (defined below) is used to denote a signal (or signals) indicative of a bitstream, or bitstream segment, or two or more bitstream segments (e.g., a transport stream, or a bitstream segment used in an adaptive streaming format), said bitstream (or bitstream segment(s)) including video data and/or encoded audio data, and typically also metadata.

An AV bitstream (e.g., a transport stream, or bitstream segment used in an adaptive streaming format or streaming method or protocol) may be indicative of at least one audio/video (audio and/or video) program ("program"), and may include (for each program indicated thereby) frames of video data (which determine at least one video elementary stream) and frames of encoded audio data (which determine at least one audio elementary stream) corresponding to the video data. The frames of video data may include or consist of I-frames of video data (video I-frames) and P-frames of video data (video P-frames), and the frames of encoded audio data may include or consist of I-frames or encoded audio data (audio I-frames) and P-frames of encoded audio data (audio P-frames).

Herein, including in the claims, "I-frame" denotes an independently decodable frame which can be decoded using information only from within itself. Herein, including in the claims, a frame which is not an I-frame (e.g., a predictively encoded frame) is referred to as a "P-frame." In an AV bitstream, a P-frame typically requires information from a previous I-frame in order to be decoded. An I-frame (or a P-frame) may include video data (and typically also metadata), and such a frame is sometimes referred to herein as a video frame or a frame of video data. An I-frame (or a P-frame) may include encoded audio data (and typically also metadata), and such a frame is sometimes referred to herein as an audio frame or a frame of audio data.

Many modern audio codecs (for example, AC-4 audio, MPEG-H audio and MPEG-D USAC audio codecs) and video codecs make use of the concept of independently decodable frames ("I-frames" as defined hereinabove) and other frames (e.g., non-independently decodable frames which are "P-frames" as defined hereinabove), so that bitstreams including audio and/or video content encoded by such codecs typically include I-frames and P-frames. Many packaged media delivery formats or protocols (for example, MPEG-DASH (Dynamic Adaptive Streaming over HTTP, published at ISO/IEC 23009-1:2012), HLS (Apple HTTP Live Streaming), MMT (MPEG Media Transport), and the MPEG-2 transport stream format) require that segments of audio (or video) content start with an I-frame to enable seamless splicing or switching) at segment boundaries, and can benefit from audio and video segment alignment. Since an audio encoder and a video encoder are typically run independently, and both are allowed to make decisions about when to create I-frames, without knowledge of the other, it is typically very difficult to get alignment between audio I-frames and video I-frames.

BRIEF DESCRIPTION OF EXEMPLARY EMBODIMENTS OF THE INVENTION

Some embodiments of the invention generate an AV bitstream including I-frames of video data (video I-frames) synchronized with I-frames of encoded audio data (audio I-frames) to solve the problem of alignment between segments of elementary streams (e.g., a video elementary stream, and one or more corresponding audio elementary streams) of the AV bitstream. In typical embodiments, the AV bitstream is indicative of at least one audio/video program ("program") and includes (for each program indicated thereby) frames of video data (which determine at least one video elementary stream) and frames of corresponding encoded audio data (which determine at least one audio elementary stream), the frames of video data include I-frames of video data (video I-frames) and P-frames of video data (video P-frames), and the frames of encoded audio data include I-frames of encoded audio data (audio I-frames) and P-frames of encoded audio data (audio P-frames). At least one frame (at least one of the video frames and/or at least one of the audio frames) of the AV bitstream has been re-authored (as a re-authored I-frame or a re-authored P-frame) so that a segment of content of the stream which includes the re-authored frame starts with an I-frame and includes at least one subsequent P-frame, and typically also so that the I-frame of the segment of content is aligned with (time-aligned with, e.g., in that it has the same time stamp value as) an I-frame of a segment of corresponding content of the stream (where the corresponding content is audio content if the content is video content, or the corresponding content is video content if the content is audio content). In some embodiments, at least one audio frame (but no video frame) of the AV bitstream has been re-authored (as a re-authored audio I-frame or a re-authored audio P-frame) so that a segment of audio content of the stream which includes the re-authored frame starts with an audio I-frame (aligned with a video I-frame of a corresponding segment of video content) and includes at least one subsequent audio P-frame. In typical embodiments, the AV bitstream has a packaged media delivery format which requires that each segment of content (audio content or video content) of the AV bitstream start with an I-frame to enable seamless adaptation (e.g., splicing or switching) at segment boundaries (e.g., at the start of a segment of video content of a video elementary stream, aligned with the start of a segment of corresponding audio content of each of at least one audio elementary stream). In some (but not all) embodiments, the packaged media delivery format is in accordance with the MPEG-DASH, HLS, or MMT method/protocol, or is the MPEG-2 transport stream format, or is based on ISO Base Media format (MPEG-4 14496-12) in general.

Herein, to "re-author" a frame (or "re-authoring" a frame) indicative of content (audio or video content) denotes replacing metadata of the frame with different metadata without modifying the content of the frame (e.g., without modifying the content by decoding such content and then re-encoding the decoded content), or replacing metadata of the frame with different metadata (and modifying content of the frame without decoding such content and then re-encoding the decoded content). For example, in some embodiments of the invention, an audio P-frame is re-authored as a re-authored audio I-frame by replacing all or some of the audio P-frame's metadata (which may be in a header of the audio P-frame) with a different set of metadata (e.g., a different set of metadata consisting of or including metadata, copied from or generated by modifying metadata obtained from, a preceding audio I-frame) without modifying the encoded audio content of the P-frame (e.g., without modifying the encoded audio content by decoding such content and then re-encoding the decoded content). For another example, an audio P-frame is re-authored as a re-authored audio I-frame including by replacing encoded audio content of the P-frame (audio content which has been encoded using delta-time (inter-frame) coding) with encoded audio content which has been encoded using intra-frame coding (i.e., the same audio content, but encoded using delta-frequency or absolute coding), without decoding the original audio content of the P-frame. For another example, in some embodiments of the invention, an audio P-frame is re-authored as a re-authored audio I-frame by copying at least one previous audio P-frame into the P-frame (including encoded audio content of each previous P-frame), so that the resulting re-authored I-frame includes a different set of metadata than the P-frame (i.e., it includes metadata of each previous P-frame as well as the original metadata of the P-frame) and also includes additional encoded audio content (the encoded audio content of each previous P-frame). For another example, in some embodiments of the invention, an audio (or video) I-frame is re-authored as a re-authored audio (video) P-frame by replacing all or some of the I-frame's metadata (which may be in a header of the I-frame) with a different set of metadata (e.g., a different set of metadata consisting of or including metadata, copied from or generated by modifying metadata obtained from, a preceding frame) without modifying the content (video or audio content) of the I-frame (e.g., without modifying encoded content of the I-frame by decoding such content and then re-encoding the decoded content).

Herein, the expression that a frame (referred to for clarity as a "first" frame though it can be any video or audio frame) of or includable in an AV bitstream has a "first decoding type" denotes that the frame is an I-frame (an independently decodable frame which has been encoded using information only from within itself, so that its decoding type is that of an I-frame) or a P-frame (so that its decoding type is that of a P-frame), and the expression that another frame (a "second frame") of or includable in the AV bitstream has a "second decoding type" (different than the first decoding type) denotes that the second frame is a P-frame (if the first frame is an I-frame) or an I-frame (if the first frame is a P-frame).

Some embodiments of the inventive method include steps of:

(a) providing an input AV bitstream comprising frames (e.g., transmitting, delivering, or otherwise providing the frames, or an input transport stream or other input AV bitstream including the frames, to an encoder or NBMP entity) indicative of audio and video content, including frames of a first decoding type, and, optionally, metadata associated with each of the frames, where each of the frames of the first decoding type comprises either a P-frame or an I-frame and is indicative of audio content (e.g., encoded audio content) or video content (e.g., encoded video content);

(b) modifying some of the metadata associated with at least one the frames of the first decoding type into different metadata to generate at least one re-authored frame of a second decoding type different from the first decoding type; and (c) generating an output AV bitstream in response to the input AV bitstream, including by re-authoring at least one of the frames of the first decoding type as a re-authored frame of a second decoding type different than the first decoding type (e.g., the re-authored frame is a re-authored I-frame if said one of the frames of the first decoding type is a P-frame, or the re-authored frame is a re-authored P-frame if said one of the frames of the first decoding type is an I-frame), such that the AV bitstream includes a segment of the content which includes the re-authored frame, and the segment of the content starts with an I-frame and includes at least one P-frame following the I-frame for aligning an I-frame of the video content with an I-frame of the audio content. For example, step (b) may include a step of re-authoring at least one audio P-frame so that the re-authored frame is an audio I-frame, or re-authoring at least one audio I-frame so that the re-authored frame is an audio P-frame, or re-authoring at least one video P-frame so that the re-authored frame is a video I-frame, or re-authoring at least one video I-frame so that the re-authored frame is a video P-frame.

In some such embodiments, step (a) includes steps of: in a first system (e.g., a production unit or encoder), generating an input AV bitstream (e.g., an input transport stream) which includes the frames indicative of the content; and delivering (e.g., transmitting) the input AV bitstream to a second system (e.g., an NBMP entity); and steps (b) and (c) are performed in the second system.

In some such embodiments, at least one audio P-frame (including metadata and encoded audio data, e.g., AC-4 encoded audio data) is re-authored as an audio I-frame (including the same encoded audio data, and different metadata). In some other ones of the embodiments, at least one audio I-frame (including metadata and encoded audio data, e.g., AC-4 encoded audio data) is re-authored as an audio P-frame (including the same encoded audio data, and different metadata). In some embodiments, at least one audio P-frame (including metadata and encoded audio content which has been encoded using delta-time (inter-frame) coding) is re-authored as a re-authored audio I-frame including by replacing the original encoded audio content of the P-frame with encoded audio content which has been encoded using intra-frame coding (i.e., the same audio content, but encoded using delta-frequency or absolute coding), without decoding the original audio content of the P-frame.

In an embodiment, the different metadata may be metadata associated with frames of the first decoding type or the second decoding type previous to the frame that is re-authored.

In some embodiments, the frame that is being re-authored is an audio P-frame. The re-authored frame is an audio I-frame. The metadata of the audio P-frame are modified by replacing some of the metadata of such audio P-frame with different metadata copied from a prior audio I-frame, so that the re-authored frame includes said different metadata.

In some other embodiments, the frame that is being re-authored is an audio P-frame. The re-authored frame is an audio I-frame. The metadata of the audio P-frame are modified by modifying metadata from a prior audio I-frame and replacing at least some of the metadata of the audio P-frame with the modified metadata, so that the re-authored frame (I-frame) includes said modified metadata.

In some other embodiments, the frame that is being re-authored is an audio P-frame. The re-authored frame is an audio I-frame. The metadata of the audio P-frame are modified by copying at least one prior P-frame into the audio P-frame such that the resulting re-authored I-frame includes a different set of metadata than the P-frame (i.e., it includes metadata of each previous P-frame as well as the original metadata of the P-frame) and also includes additional encoded audio content (the encoded audio content of each previous P-frame).

In some embodiments generating the output AV bitstream comprises determining the segment of the audio and video content of the output AV bitstream as a segment of the video content (e.g. the input video content of the input AV bitstream) which starts with an I-frame. In other words, a segment of the audio and video content is defined by the (e.g. input) video content. A segment of audio and video content starts with an I-frame of the (e.g. input) video content. The audio frames are re-authored so as that an I-frame of the audio content is aligned with an I-frame of the video content. The segment of the audio and video content starts also with an I-frame of the audio content.

In some embodiments, generating the output AV bitstream, comprises passing audio and video content and metadata of a segment of the content of the input AV bitstream which has been not modified to the output AV bitstream. For example, a buffer may be used to buffer (e.g. store) segments of the content of the input AV bitstream. A subsystem may be configured to re-author of one of the frames of such buffered segment of the content and to pass through those frames which are unmodified by re-authoring. Any media content and metadata which is unmodified by the subsystem pass from the input AV bitstream to the output AV bitstream. The generated output AV bitstream comprises unmodified frames of the input AV bitstream and the re-authored frame.

In a first class of embodiments (sometimes referred to herein as embodiments implementing "Method 1"), the inventive method includes: (a) generating audio I-frames and audio P-frames (e.g., in a conventional manner) indicative of content; and (b) generating an AV bitstream including by re-authoring at least one of the audio P-frames as a re-authored audio I-frame, so that the AV bitstream includes a segment of the content which includes the re-authored audio I-frame, and the segment of the content starts with the re-authored audio I-frame. Typically, the segment of the content also includes at least one of the audio P-frames following the re-authored audio I-frame. Steps (a) and (b) may be performed in an audio encoder (e.g., a production unit including or implementing an audio encoder), including by operating the audio encoder to perform step (a).

In some embodiments which implement Method 1, step (a) is performed in an audio encoder (e.g., an AC-4 encoder) which generates the audio I-frames and the audio P-frames, step (b) includes re-authoring of at least one of the audio P-frames (corresponding to a time at which an audio I-frame is needed) as the re-authored audio I-frame, and step (b) also includes a step of including the re-authored audio I-frame in the AV bitstream instead of said one of the audio P-frames.

Some embodiments which implement Method 1 include: in a first system (e.g., a production unit or an encoder), generating an AV bitstream (e.g., an input transport stream) which includes the audio I-frames and the audio P-frames generated in step (a); delivering (e.g., transmitting) the input AV bitstream to a second system (e.g., an NBMP entity); and performing step (b) in the second system.

In a second class of embodiments (sometimes referred to herein as embodiments implementing "Method 2"), the inventive method includes: (a) generating audio I-frames (e.g., in a conventional manner) indicative of content; and (b) generating an AV bitstream including by re-authoring at least one of the audio I-frames as a re-authored audio P-frame, so that the AV bitstream includes a segment of the content which includes the re-authored audio P-frame, and the segment of the content starts with one of the audio I-frames generated in step (a). Steps (a) and (b) may be performed in an audio encoder (e.g., a production unit including or implementing an audio encoder), including by operating the audio encoder to perform step (a).

In some embodiments which implement Method 2, step (a) is performed in an audio encoder (e.g., an AC-4 encoder) which generates the audio I-frames, and step (b) includes re-authoring each of the audio I-frames which corresponds to a time other than a segment boundary (and thus does not occur at a segment boundary), thereby determining at least one re-authored audio P-frame, and the step of generating the AV bitstream includes a step of including the at least one re-authored audio P-frame in the AV bitstream.

Some embodiments which implement Method 2 include: in a first system (e.g., a production unit or encoder), generating an AV bitstream (e.g., an input transport stream) which includes the audio I-frames generated in step (a); delivering (e.g., transmitting) the input AV bitstream to a second system (e.g., an NBMP entity); and performing step (b) in the second system.

Some embodiments of the inventive method of generating an AV bitstream (e.g., including by re-authoring of at least one frame of an input AV bitstream) are implemented so that the AV bitstream satisfies at least one currently underlying network constraint or other constraint (e.g., generation of the AV bitstream includes re-authoring of at least one frame of an input bitstream, and is performed such that the AV bitstream satisfies at least one currently underlying network constraint on the input bitstream). For instance, when the AV bitstream is generated by an NBMP entity (e.g., an MPEG NBMP entity which is or is included in a CDN server), the NBMP entity may be implemented to insert I-frames in or remove I-frames from the AV bitstream in a manner depending on network and other constraints. Examples of such constraints include but are not limited to available bitrate, needed tune-in time into a program, and/or segment duration of an underlying MPEG-DASH or MMT AV bitstream.

In some embodiments, a method for generating an AV bitstream includes:

providing frames, where at least one of the frames is a hybrid frame including a P-frame and an I-frame, where the I-frame is indicative of an encoded version of content and the P-frame is indicative of a differently encoded version of the content, and where each of the frames is indicative of audio content or video content; and generating the AV bitstream, including by selecting the P-frame of at least one said hybrid frame, and including each selected P-frame in the AV bitstream, such that the AV bitstream includes a segment which starts with an I-frame and includes at least said selected P-frame following the I-frame.

In some embodiments, the inventive method includes a step of adapting (e.g., switching or splicing) an AV bitstream (e.g., having MPEG-2 format, or MPEG-DASH or MMT format) which is indicative of at least one audio/video program ("program") and has been generated in accordance with any embodiment of the inventive method for generating an AV bitstream, thereby generating an adapted (e.g., spliced) AV bitstream. In typical embodiments, the adapted AV bitstream is generated without modifying any encoded audio elementary stream of the AV bitstream. In some embodiments including a step of adapting (e.g., switching or splicing) an AV bitstream, where the adapting is performed at an adaptation point of the AV bitstream (e.g., a time in a program indicated by the AV bitstream) corresponding to a video I-frame (e.g., re-authored video I-frame) and at least one corresponding re-authored audio I-frame of the AV bitstream. In typical embodiments in which the AV bitstream includes (for each program indicated thereby) frames of video data (which determine at least one video elementary stream) and frames of corresponding encoded audio data (which determine at least one audio elementary stream), the adapting (e.g., splicing) is performed in a manner which guarantees that audio/video synchronization ("A/V" sync) is maintained without the need for modification by the adapter (e.g., splicer) of any encoded audio elementary stream of the AV bitstream.

An AV bitstream generated in accordance with any of typical embodiments of the inventive method has (i.e., satisfies) the property of I-frame synchronization (i.e., video and audio encoding are synchronized such that for each program indicated by the AV bitstream, for each video I-frame in a video elementary stream of the program, there is at least one matching audio I-frame (i.e., at least one audio I-frame synchronized with the video I-frame) in an audio elementary stream of the program), in the sense that, for each program indicated by the AV bitstream, data of the AV bitstream which is indicative of the program has the property of I-frame synchronization.

Another aspect of another embodiment of the invention is an audio/video processing unit (AVPU) configured to perform any embodiment of the inventive method (e.g., for generation and/or adaptation of an AV bitstream). For example, the AVPU may be an NBMP entity (e.g., an MPEG NBMP entity, which may be or may be included in a CDN Server) programmed or otherwise configured to perform any embodiment of the inventive method. For another example, the AVPU may be an adapter (e.g., a splicer) configured to perform any embodiment of the inventive AV bitstream adapting (e.g., splicing) method. In another class of embodiments the invention the AVPU includes a buffer memory (buffer) which stores (e.g., in a non-transitory manner) at least one segment of an AV bitstream which has been generated by any embodiment of the inventive method.

Examples of AVPUs include, but are not limited to encoders (e.g., transcoders), NBMP entities (e.g., NBMP entities configured to generate and/or perform adaptation on an AV bitstream), decoders (e.g., decoders configured to decode content of an AV bitstream, and/or to perform adaptation (e.g., splicing) on an AV bitstream to generate an adapted (e.g., spliced) AV bitstream and to decode content of the adapted AV bitstream), codecs, AV bitstream adapters (e.g., splicers), pre-processing systems (pre-processors), post-processing systems (post-processors), AV bitstream processing systems, and combinations of such elements.

Some embodiments of the invention include a system or device configured (e.g., programmed) to perform any embodiment of the inventive method, and a computer readable medium (e.g., a disc) which stores code (e.g., in a non-transitory manner) for implementing any embodiment of the inventive method or steps thereof. For example, the inventive system can be or include a programmable general purpose processor, digital signal processor, or microprocessor, programmed with software or firmware and/or otherwise configured to perform any of a variety of operations on data, including an embodiment of the inventive method or steps thereof. Such a general purpose processor may be or include a computer system including an input device, a memory, and processing circuitry programmed (and/or otherwise configured) to perform an embodiment of the inventive method (or steps thereof) in response to data asserted thereto.

NOTATION AND NOMENCLATURE

Figure 1:
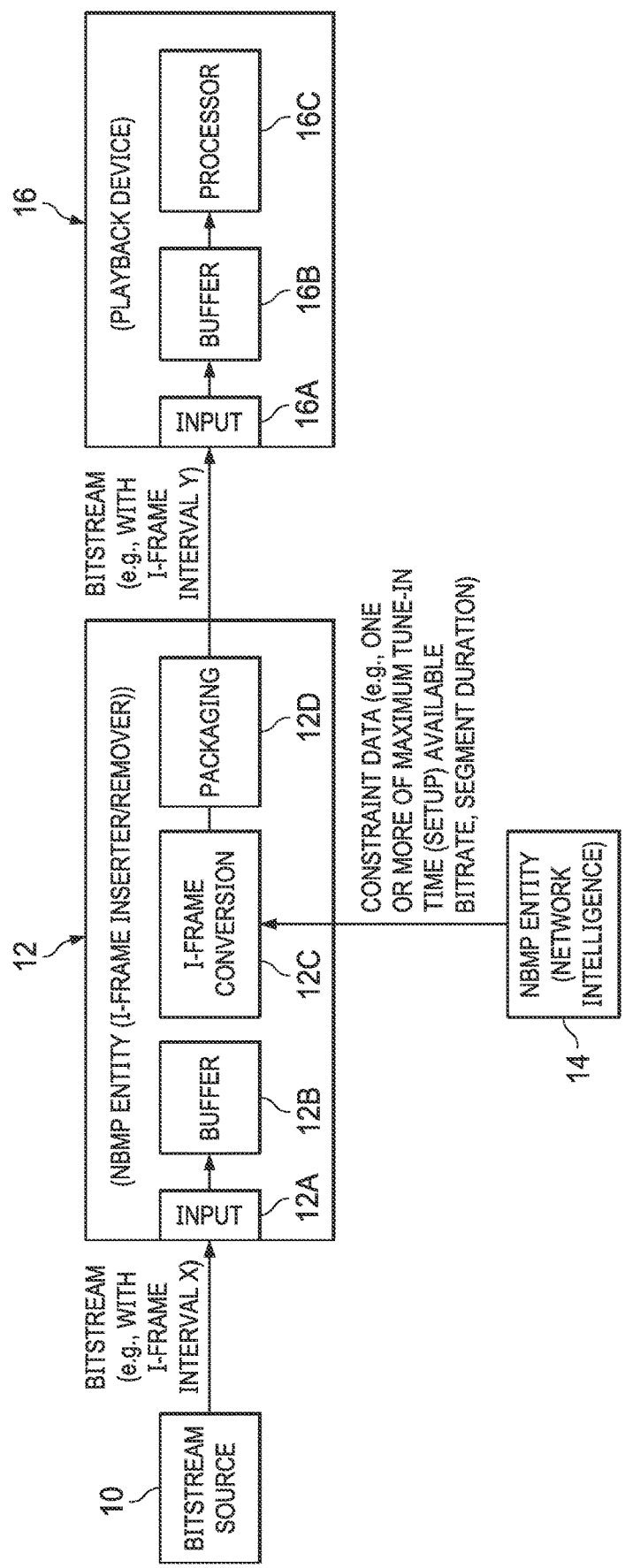
FIG. 1 is a block diagram of a content delivery network, in which NBMP entity 12 (and optional also at least one other element) is configured in accordance with an embodiment of the invention.

Throughout this disclosure, including in the claims, the expression performing an operation "on" a signal or data (e.g., filtering, scaling, transforming, or applying gain to, the signal or data) is used in a broad sense to denote performing the operation directly on the signal or data, or on a processed version of the signal or data (e.g., on a version of the signal that has undergone preliminary filtering or pre-processing prior to performance of the operation thereon).

Throughout this disclosure including in the claims, the expression "system" is used in a broad sense to denote a device, system, or subsystem. For example, a subsystem that implements encoding may be referred to as an encoder system, and a system including such a subsystem (e.g., a system that generates X output signals in response to multiple inputs, in which the subsystem generates M of the inputs and the other X—M inputs are received from an external source) may also be referred to as an encoder system.

Throughout this disclosure including in the claims, the expression "AV bitstream" denotes a signal (or signals) indicative of a bitstream, or bitstream segment, or two or more bitstream segments (e.g., a transport stream, or a bitstream segment used in an adaptive streaming format), said bitstream (or bitstream segment(s)) including video data and/or encoded audio data, and typically also metadata. The expression "AV data" is sometimes used herein to denote such video data and/or such encoded audio data. Typically, a transport stream is a signal indicative of a serial bitstream including a sequence of segments (e.g., packets) of encoded audio data, segments (e.g., packets) of video data, and segments (e.g., headers or other segments) of metadata (e.g., including metadata which supports splicing). An AV bitstream (e.g., a transport stream) may be indicative of multiple programs, and each program may include multiple elementary streams (e.g., a video elementary stream, and two or more audio elementary streams). Typically, each elementary stream of a transport stream has an associated descriptor that includes information related to the elementary stream.

Throughout this disclosure including in the claims, the term "processor" is used in a broad sense to denote a system or device programmable or otherwise configurable (e.g., with software or firmware) to perform operations on data (e.g., audio, and/or video or other image data). Examples of processors include a field-programmable gate array (or other configurable integrated circuit or chip set), a digital signal processor programmed and/or otherwise configured to perform pipelined processing on audio or other sound data, a programmable general purpose processor or computer, and a programmable microprocessor chip or chip set.

Throughout this disclosure including in the claims, the expressions "audio/video processing unit" (or "AV processing unit" or "AVPU") and "AV processor" are used interchangeably, and in a broad sense, to denote a system configured to process an AV bitstream (or video data and/or encoded audio data of an AV bitstream). Examples of AV processing units include, but are not limited to encoders (e.g., transcoders), decoders, codecs, NBMP entities, splicers, pre-processing systems, post-processing systems, and bitstream processing systems (sometimes referred to as bitstream processing tools). In one example, an AV processing unit is a splicer configured to determine an out point (i.e., time) of a first transport stream and an in point (i.e., another time) of a second transport stream (which can be the first transport stream, or a different transport stream which is not the first transport stream), and to generate a spliced transport stream (e.g., a spliced transport stream which includes data of the first bitstream occurring prior to the out point and data of the second bitstream occurring after the in point).

Throughout this disclosure including in the claims, the expression "metadata" refers to separate and different data from corresponding audio data and/or video data (audio and/or video content of a bitstream which also includes metadata). Metadata is associated with audio and/or video data ("AV" data), and indicates at least one feature or characteristic of the AV data (e.g., what type(s) of processing have already been performed, or should be performed, on the AV data, or the trajectory of an object indicated by audio data of the AV data). The association of the metadata with the AV data is time-synchronous. Thus, present (most recently received or updated) metadata may indicate that the corresponding AV data contemporaneously has an indicated feature and/or comprises the results of an indicated type of audio and/or video data processing.

Throughout this disclosure including in the claims, the term "couples" or "coupled" is used to mean either a direct or indirect connection. Thus, if a first device couples to a second device, that connection may be through a direct connection, or through an indirect connection via other devices and connections.

DETAILED DESCRIPTION OF EXEMPLARY EMBODIMENTS

Figure 4:
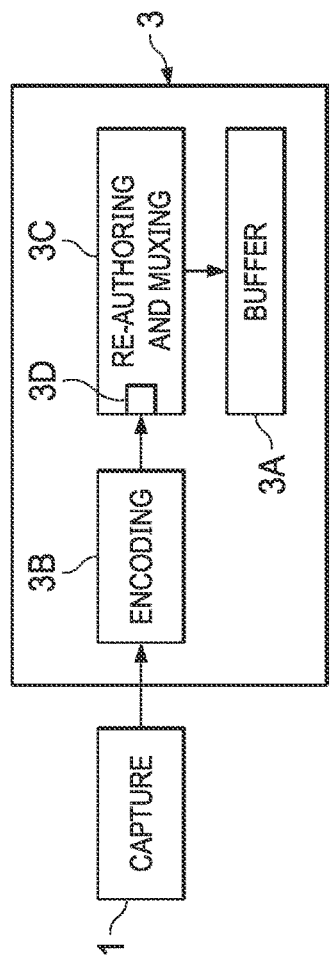
FIG. 4 is a block diagram of a system including an implementation of production unit 3 of FIG. 3, configured in accordance with an embodiment of the invention, and capture unit 1 of FIG. 3.

Some embodiments of the invention are methods and systems for generating an AV bitstream that includes I-frames of video data (video I-frames) synchronized with I-frames of encoded audio data (audio I-frames), where the AV bitstream provides a solution to the problem of alignment between segments of elementary streams (e.g., a video elementary stream, and one or more corresponding audio elementary streams) of the AV bitstream. For example, each of NBMP entity 12 of the content delivery network of FIG. 1, the system of FIG. 7, and production unit 3 of FIG. 4, is a system configured in accordance with an embodiment of the invention to generate such an AV bitstream.

Independently decodable frames which are generated in accordance with some video and audio codec formats, and which are I-frames as defined above, may not be officially defined (in the formal specification of the relevant codec format) or commonly referred to as "I-frames" (and may instead be referred to by other names, e.g., as IDR-frames, IPF-Frames or IF-Frames). In some codecs, every video frame and/or every audio frame is independently decodable, and each such frame is an "I-frame."

In some cases, encoded audio data of an audio P-frame (e.g., an audio P-frame whose audio content is AC-4 encoded audio data) can be decoded using information only from within the P-frame, although upon playback the decoded audio will, in some cases, not sound exactly as originally intended at the time of the original encoding. In some cases, in order for a decoded version of the P-frame's audio content to sound as originally intended upon playback, metadata from a prior I-frame (e.g., dynamic range control metadata, downmix metadata, loudness metadata, spectral extension metadata or coupling metadata) typically would need to available for use (and typically would need to be used) during the decoding.

In some cases a P-frame may refer to data transmitted in previous frames for correct decoding. Video P-frames use previous data together with transmitted data to generate a predicted version of a picture of that video frame and only transmit differences to that picture. Audio P-frames may use differential coding of parameters that can be predicted from previous frames, e.g. use differential coding of spectral envelopes as used in ASPX of AC-4 or panning data of ACPL.

Herein, each of the terms "adapting" (of an AV bitstream, e.g., a transport stream, or another bitstream), and performing "adaptation" (on a bitstream), is used in a broad sense to denote performing any operation on the bitstream which includes accessing content indicated by the bitstream (e.g., content of one or more elementary streams of a program indicated by the bitstream), where the content occurs at (corresponds to) a specific time (e.g., a time of an I-frame included in the bitstream in accordance with an embodiment of the invention). Examples of adaptation of a bitstream include (but are not limited to): adaptive bitrate switching (e.g., switching, at a specific time in a bitstream, between different bitrate versions of content indicated by the bitstream); alignment of elementary streams (audio elementary streams, or video and audio elementary streams) of a program of (indicated by) a bitstream; splicing, at a specific time, a program indicated by a bitstream with another program (e.g., indicated by another bitstream); concatenating, at a specific time, a program indicated by a bitstream (or a segment thereof) with another program; or initiating playback, at a specific time, of a program indicated by a bitstream (or a segment thereof). The expression "adaptation point" (of an AV bitstream, e.g., a transport stream, or another bitstream) is used in a broad sense to denote a time in the bitstream (e.g., as indicated by a time stamp value) at which an I-frame occurs (or a video I-frame and at least one corresponding audio I-frame occur), so that adaptation (e.g., switching or splicing) may be performed on the bitstream at the adaptation point.

An AV bitstream (e.g., a transport stream) may be indicative of multiple programs. Each program may include multiple elementary streams (e.g., a video elementary stream, and one or more encoded audio elementary streams). An elementary stream may be a video elementary stream (including video data), or an audio elementary stream (e.g., corresponding to a video elementary stream) including encoded audio data (e.g., encoded audio data output from an audio encoder).

Although the methods and systems according to the embodiments of the invention are not limited to generation and/or splicing (or other adaptation) of transport streams having MPEG-2 transport stream format (or AV bitstreams having format in accordance with MPEG-DASH or MMT, or any other specific format), or including encoded audio data of any specific format, some embodiments are methods and systems for generating and/or adapting (e.g., splicing) MPEG-2 transport streams (or AV bitstreams having formats in accordance with MPEG-DASH or MMT) whose audio frames include encoded audio data in the format known as AC-4 (or the MPEG-D USAC or MPEG-H Audio format). Transport streams having other formats (or AV bitstreams which are not transport streams, e.g., bitstream segments having an adaptive streaming format or used in a streaming method or protocol) may be generated and/or adapted (e.g., switched or spliced) in accordance with other embodiments of the invention, if each such AV bitstream (e.g., bitstream segment) includes P-frames and I-frames of video data and/or P-frames and I-frames of encoded audio data. Frames (e.g., audio frames) of an AV bitstream (e.g., transport stream) generated and/or adapted (e.g., spliced) in accordance with a class of typical embodiments of the invention typically also include metadata.

The adaptive streaming protocol known as MPEG-DASH allows streaming of media content over the Internet using HTTP web servers. In accordance with MPEG-DASH, media content of a Media Presentation (which also includes metadata) is broken into a sequence of segments. The segments are organized as representations (each representation including a sequence of segments, e.g., a sequence including the two "MPEG-DASH Segments" indicated in FIG. 5), adaptations (each adaptation including a sequence of representations), and periods (each period including a sequence of adaptations). A Media Presentation can include many periods.

Although segments of a Media Presentation (or a can contain any media data, the MPEG-DASH specification provides guidance and formats for use with two types of media data containers: ISO base media file format (e.g., MPEG-4 file format) or the MPEG-2 Transport Stream format. Thus, in some cases, media content (and metadata) having MPEG-DASH format may be delivered as a sequence of MPEG-4 files, and not as a single bitstream.

MPEG-DASH is audio/video codec agnostic. Thus, media content of an MPEG-DASH Media Presentation could include encoded audio content which has been encoded in accordance with one audio encoding format (e.g., AC-4 encoded audio content), and additional encoded audio content which has been encoded in accordance with another audio encoding format, and video content which has been encoded in accordance with one video encoding format, and additional video content which has been encoded in accordance with another video encoding format.

Data having MPEG-DASH format can include one or more representations (e.g., versions having at different resolutions or bit rates) of a multimedia file. Selection among such representations can be implemented based on network conditions, device capabilities, and user preferences, thus enabling adaptive bitrate streaming.

Figure 5:
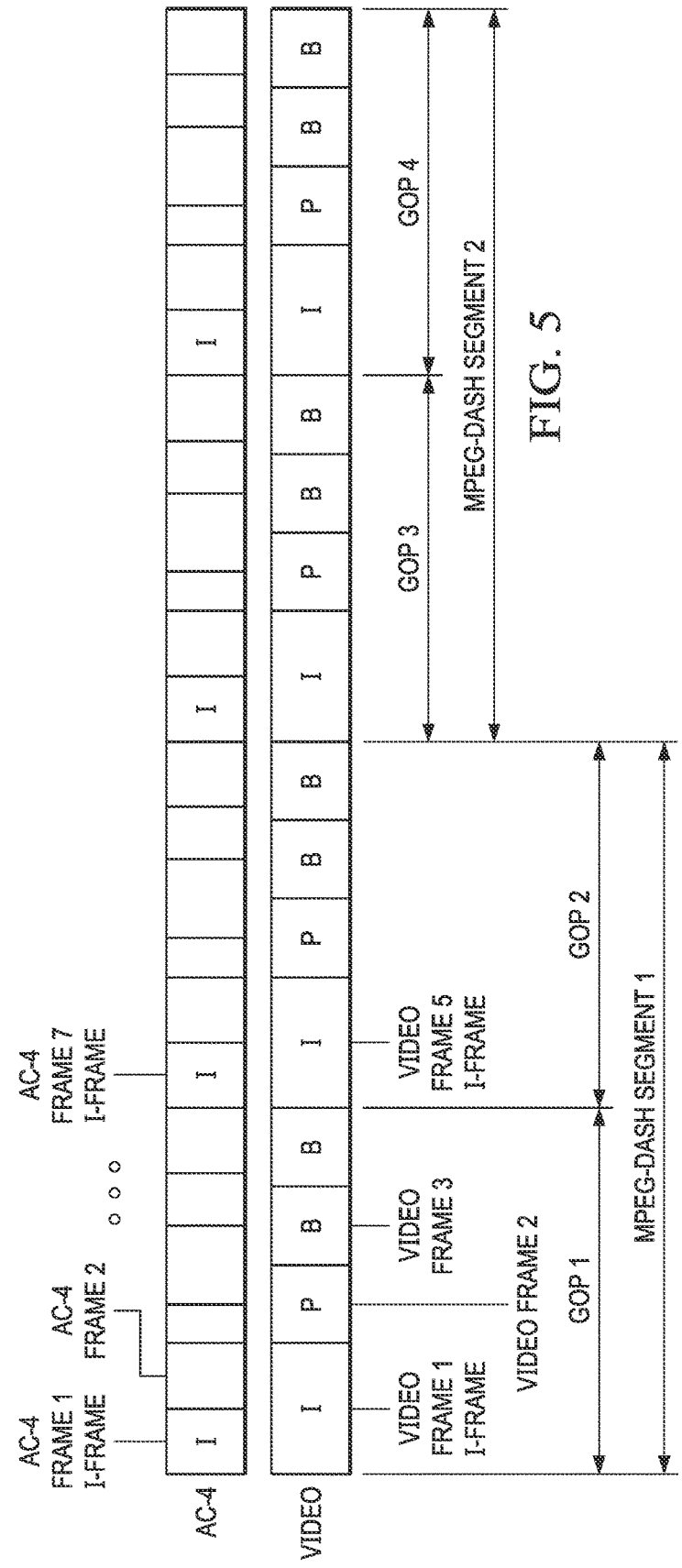
FIG. 5 is diagram a segment of an AV bitstream having MPEG-DASH format.

FIG. 5 is a diagram of an example of one segment of an AV bitstream (as defined herein) which has the MPEG-DASH adaptive streaming format. Although the AV bitstream (or the segment thereof shown in FIG. 5) may not be delivered as a single bitstream (e.g., having a single bitrate), the AV bitstream (and the segment thereof shown in FIG. 5) are examples of an "AV bitstream" as defined herein. The media content of the segment shown in FIG. 5 includes encoded audio data which is encoded in accordance with the AC-4 encoding standard as a sequence of AC-4 audio frames, and corresponding video content which is encoded as a sequence of video frames. The AC-4 audio frames include audio I-frames (e.g., AC-4 Frame 1, and AC-4 Frame 7) and audio P-frames (e.g., AC-4 Frame 2). The video frames include video I-frames (e.g., Video Frame 1, and Video Frame 5) and video P-frames. In FIG. 5, each video frame labeled with a "P" (indicating "predictively" encoded) or with a "B" (indicating "bidirectionally predictively" encoded) is a video "P-frame" as defined herein. The video P-frames of FIG. 5 include Video Frame 2 and Video Frame 3.

Each video I-frame of FIG. 5 is aligned with a corresponding audio I-frame (e.g., AC-4 Frame 7, which is an audio I-frame, is aligned with Video Frame 5, which is a video I-frame). Thus, each of the segments (of the AV bitstream of FIG. 5) labeled GOP 1 (where GOP denotes "group of pictures"), GOP 2, GOP 3, and GOP 4 begins at a time which is an "adaptation point" (as defined herein) of an AV bitstream. Thus, adaptation (e.g., switching) may be performed seamlessly on the AV bitstream at any of these adaptation points. Segments GOP 1 and GOP 2 together correspond to a longer segment (labeled "MPEG-DASH Segment 1") of the AV bitstream, and segments GOP 3 and GOP 4 together correspond to a longer segment (labeled "MPEG-DASH Segment 2") of the AV bitstream, and each of these longer segments also begins at an adaptation point.

The MPEG-2 transport stream format is a standard format for transmission and storage of video data, encoded audio data, and related data. The MPEG-2 transport stream format is specified in the standard known as MPEG-2 Part 1, Systems (ISO/IEC standard 13818-1 or ITU-T Rec.

H.222.0). An MPEG-2 transport stream has a specified container format which encapsulates packetized elementary streams.

MPEG-2 transport streams are commonly used to broadcast audio and video content, for example, in the form of DVB (Digital Video Broadcasting) or ATSC (Advanced Television Systems Committee) TV broadcasts. It is often desirable to implement a splice between two MPEG-2 transport streams.

An MPEG-2 transport stream carries (i.e., includes data indicative of) elementary streams (e.g., an elementary stream of video data output from a video encoder, and at least one corresponding elementary stream of encoded audio data output from an audio encoder) in packets. Each elementary stream is packetized by encapsulating sequential data bytes from the elementary stream in packetized elementary stream ("PES") packets having PES packet headers. Typically, elementary stream data (output from video and audio encoders) is packetized as PES packets, the PES packets are then encapsulated inside Transport Stream (TS) packets, and the TS packets are then multiplexed to form the transport stream. Typically, each PES packet is encapsulated into a sequence of TS packets. A PES packet may be indicative of an audio or video frame (e.g., an audio frame comprising metadata and encoded audio data, or a video frame comprising metadata and video data).

At least one (one or more) of the TS packets, of a sequence of TS packets (of a transport stream) indicative of an audio frame, may include metadata which is needed to decode the audio content of the frame. At least one (one or more) of the TS packets indicative of an audio I-frame includes metadata sufficient to enable independent decoding of the audio content of the frame. Although at least one (one or more) of the TS packets indicative of an audio P-frame includes metadata needed to decode the audio content of the frame, additional metadata (of a prior I-frame) is typically also needed in order to decode the audio content of the frame.

An MPEG-2 transport stream may be indicative of one or more audio/video programs. Each single program is described by a Program Map Table (PMT) which has a unique identification value (PID), and the elementary stream(s) associated with that program has (or have) a PID listed in the PMT. For example, a transport stream may be indicative of three television programs, each program corresponding to a different television channel. In the example, each program (channel) may consist of one video elementary stream and a number of (e.g., one or two) encoded audio elementary streams, and any necessary metadata. A receiver wishing to decode a particular program (channel) decodes the payloads of each elementary stream whose PID is associated with the program.

An MPEG-2 transport stream includes Program Specific Information (PSI), typically comprising data indicative of four PSI tables: a program association table (PAT), a program map table (PMT) for each program, a conditional access table (CAT), and a network information table (NIT). The program association table lists all programs indicated by (included in) the transport stream, and each of the programs has an associated value of PID for its program map table (PMT). The PMT for a program lists each elementary stream of the program, and includes data indicative of other information regarding the program.

An MPEG-2 transport stream includes presentation time stamp ("PTS") values which are used to achieve synchronization of separate elementary streams (e.g., video and encoded audio streams) of a program of the transport stream. The PTS values are given in units related to a program's overall clock reference, which is also transmitted in the transport stream. All TS packets that comprise an audio or video frame (indicated by a PES packet) have the same PTS (time stamp) value.

An AV bitstream (e.g., an MPEG-2 transport stream or an AV bitstream having MPEG-DASH format) may include encoded audio data (typically, compressed audio data indicative of one or more channels of audio content), video data, and metadata indicative of at least one characteristic of the encoded audio (or encoded audio and video) content. Although the embodiments of the invention are not limited to generation of AV bitstreams (e.g., transport streams) whose audio content is audio data encoded in accordance with the AC-4 format ("AC-4 encoded audio data"), typical embodiments are methods and systems for generating and/or adapting AV bitstreams (e.g., bitstream segments used in an adaptive streaming format) including AC-4 encoded audio data.

The AC-4 format for encoding of audio data is well-known, and was published in April 2014 in the document entitled the "ETSI TS 103 190 V1.1.1 (2014 April), Digital Audio Compression (AC-4) Standard."

MPEG-2 transport streams are commonly used to broadcast audio and video content, for example in the form of DVB (Digital Video Broadcasting) or ATSC (Advanced Television Systems Committee) TV broadcasts. Sometimes it is desirable to implement a splice between two MPEG-2 (or other) transport streams. For example, it may be desirable for a transmitter to implement splices in a first transport stream to insert an advertisement (e.g., a segment of another stream) between two segments of the first transport stream. Conventional systems, known as transport stream splicers, are available for performing such splicing. The sophistication of conventional splicers varies, and conventional transport streams are usually generated with the assumption that splicers will be aware of and able to understand all the codecs contained in them (i.e., will be able to parse their video and encoded audio content, and metadata) in order to perform splices on them. This leaves much room for errors for the implementation of splices, and gives rise to many problems with interoperability between muxers (which perform multiplexing to generate transport streams or other AV bitstreams) and splicers.

Typical embodiments of the present invention can be included in an element of network (e.g., a content delivery network or "CDN") configured to deliver media (including audio and video) content to end users. Network-Based Media Processing (NBMP) is a framework that allows service providers and end users to describe media processing operations that are to be performed by such a network. An example of NBMP is the MPEG-I Part 8, Network Based Media Processing framework which is being developed. It is contemplated that some embodiments of the inventive apparatus will be implemented as an NBMP entity (e.g., an MPEG NBMP entity, which may be or may be included in a CDN Server) programmed or otherwise configured in accordance with an embodiment of the invention (e.g., to insert I-frames in or remove I-Frames from an AV bitstream, optionally in a manner depending on network and/or other constraints). NBMP describes the composition of network-based media processing services out of a set of network-based media processing functions and makes these network-based media processing services accessible through Application Programming Interfaces (APIs). An NBMP media processing entity (NBMP entity) performs media processing tasks on the media data (and related metadata)

which is input thereto. NBMP also provides control functions that are used to compose and configure the media processing.

FIG. 1 is a block diagram of a content delivery network, in which NBMP entity 12 is configured in accordance with an embodiment of the invention to generate (and deliver to playback device 16) an AV bitstream including at least one re-authored frame. In typical embodiments, the AV bitstream is indicative of at least one audio/video program ("program") and includes (for each program indicated thereby) frames of video data (which determine at least one video elementary stream) and frames of corresponding encoded audio data (which determine at least one audio elementary stream). The frames of video data include I-frames of video data (video I-frames) and P-frames of video data (video P-frames), and the frames of encoded audio data include I-frames of encoded audio data (audio I-frames) and P-frames of encoded audio data (audio P-frames). At least one frame (at least one of the video frames and/or at least one of the audio frames) of the AV bitstream has been re-authored (as a re-authored I-frame or a re-authored P-frame) by entity 12 so that a segment of content which includes the re-authored frame starts with an I-frame and includes at least one subsequent P-frame. In some embodiments, at least one audio frame (but no video frame) of the AV bitstream has been re-authored (as a re-authored audio I-frame or a re-authored audio P-frame) by entity 12 so that a segment of audio content which includes the re-authored frame starts with an audio I-frame (aligned with a video I-frame of a corresponding segment of video content) and includes at least one subsequent audio P-frame.

In FIG. 1, bitstream source 10 is configured to generate an input AV bitstream (e.g., a standard compatible transport stream, for example, a transport stream compatible with a version of the MPEG standard, e.g., the MPEG-2 standard, or another transport stream, or an input AV bitstream which is not a transport stream) including video frames (of video data and corresponding metadata) and audio frames (of encoded audio data, e.g., that is compatible with an audio format such as the AC-4 format, and metadata). In some implementations of source 10, the input AV bitstream is generated in a conventional manner. In other implementations, source 10 generates the input AV bitstream in accordance with an embodiment of the inventive AV bitstream generating method (including by re-authoring at least one frame).

It should be appreciated that many implementations of (and variations on) the FIG. 1 system are contemplated. For example, in some implementations, elements 10, 12, 14, and 16 are implemented in different devices or systems coupled (at different locations) to a network. In one such implementation: source 10 (or a device or subsystem coupled thereto) is configured to package (e.g., as an AV bitstream having format in accordance with MPEG-DASH, or HLS, or MMT, or another adaptive streaming format or method/protocol) the content (e.g., encoded audio data, or both video data and encoded audio data) and metadata generated by said source 10 for delivery (e.g., to NBMP entity 12) over the network; and NBMP entity 12 (or a device or subsystem coupled thereto) is configured to package (e.g., as an AV bitstream having format in accordance with MPEG-DASH, or HLS, or MMT, or another adaptive streaming format or method/protocol) the content (e.g., encoded audio data, or both video data and encoded audio data) and metadata generated by said entity 12 (including at least one re-authored frame) for delivery (e.g., to playback device 16) over the network.

Figure 3:
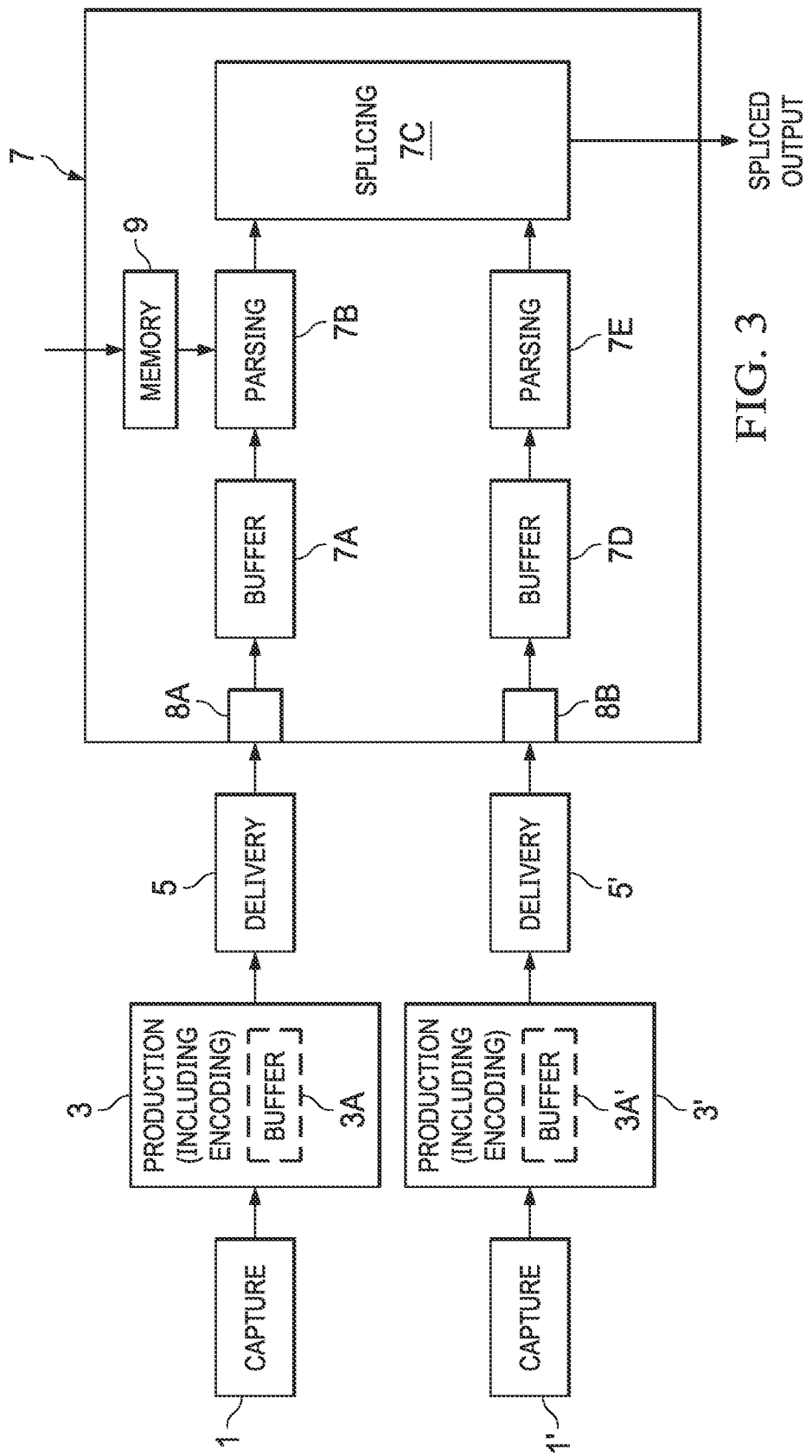
FIG. 3 is a block diagram of an embodiment of a system, in which one or more of the elements of the system may be configured in accordance with an embodiment of the invention.

For another example, in some implementations, elements 10 and 12, and optionally also 14, are implemented as a single device or system (e.g., a production unit performing the functions of production unit 3 of FIG. 3) coupled to a network. In one such implementation: source 10 is configured to provide frames including content (e.g., encoded audio data, or both video data and encoded audio data) and metadata to NBMP entity 12; NBMP entity 12 is configured to re-author at least one of the frames (in accordance with an embodiment of the invention) thereby generating a modified set of frames; and NBMP entity 12 (or a subsystem coupled thereto) is configured to package (e.g., as an AV bitstream having format in accordance with MPEG-DASH, or HLS, or MMT, or another adaptive streaming format or method/protocol) the modified set of games for delivery (e.g., to playback device 16) over the network.

For another example, elements 10, 12, and 14 are configured to generate and process only audio content (and corresponding metadata), including by re-authoring (in element 12) at least one frame including encoded audio data in accordance with an embodiment of the invention. A video processing subsystem (not shown in FIG. 1) is optionally employed to generate and process only video content (and corresponding metadata), for example, including by re-authoring at least one frame including video data in accordance with an embodiment of the invention. A device or subsystem may be coupled to element 12 (and to the video processing subsystem) and configured to package (e.g., as an AV bitstream having format in accordance with MPEG-DASH, or HLS, or MMT, or another adaptive streaming format or method/protocol) the frames (including each re-authored frame) generated by elements 10, 12, and 14 (and the video processing elements), e.g., for delivery over the network (e.g., to playback device 16).

In some implementations, NBMP entity 14 is omitted (and described functions implemented by entity 14 are instead performed by NBMP entity 12).

In a first example embodiment, NBMP entity 12 may be implemented as a single device configured to perform both audio processing (including audio frame re-authoring) and video processing (including video frame re-authoring), and a second NBMP entity coupled to this device could package both the audio output of entity 12 (e.g., a raw AC-4 bitstream or other data stream) and the video output of entity 12, as an AV bitstream (e.g., an AV bitstream having format in accordance with MPEG-DASH, or HLS, or MMT, or another adaptive streaming format or method/protocol). In a second example embodiment, NBMP entity 12 may be implemented as a single device configured to perform the functions of both entity 12 and the second NBMP entity in the first example embodiment. In a third example embodiment, NBMP entity 12 is implemented as a first device configured to perform audio processing (including audio frame re-authoring), another NBMP entity is implemented as a second device configured to perform video processing (including video frame re-authoring), and a third NBMP entity coupled to both such devices could package the audio output of the first device (e.g., a raw AC-4 bitstream or other data stream) and the video output of the second device, as an AV bitstream (e.g., an AV bitstream having format in accordance with MPEG-DASH, or HLS, or MMT, or another adaptive streaming format or method/protocol).

In some implementations, source 10 and NBMP entity 12 (or source 10, NBMP entity 12, and a packaging system configured to package the output of entity 12 as an AV bitstream) are implemented at an encoding/packaging facility and entity 12 (or a packaging system coupled thereto) is configured to output an AV bitstream, and playback device 16 is located remote from this facility. In some other implementations, source 10 (and a packaging system coupled and configured to package the output of source 10 as an AV bitstream) is implemented at an encoding/packaging facility, and NBMP entity 12 and playback device 16 be located together at a remote playback location (so that NBMP 12 is coupled and configured to generate an AV bitstream including at least one re-authored frame, in response to the AV bitstream delivered to the playback location from the encoding/packaging facility. In any of these implementations, NBMP entity 14 may be implemented at a location remote from NBMP entity 12, or at the same location as NBMP 12, or entity 14 may be omitted (and entity 12 may be implemented to perform the described functions of entity 14). Other variations on the FIG. 1 system may implement other embodiments of the invention.

Next, we describe in greater detail example implementations of the system of FIG. 1.

Typically, the input AV bitstream generated by source 10 is indicative of at least one audio/video program ("program"), and includes (for each program indicated thereby) frames of video data (which determine at least one video elementary stream) and frames of encoded audio data (which determine at least one audio elementary stream) corresponding to the video data. The input AV bitstream may include a sequence of I-frames including video data (video I-frames), I-frames including encoded audio data (audio I-frames), P-frames including video data (video P-frames), and I-frames including encoded audio data (audio P-frames), or it may include a sequence of video I-frames and video P-frames, and a sequence of audio I-frames. The audio I-frames of the input AV bitstream may occur at a first rate (e.g., once per each time interval X, as indicated in FIG. 1).

The input AV bitstream may have a packaged media delivery format (e.g., a standardized format, such as but not limited to one in accordance with the MPEG-DASH, HLS, or MMT method/protocol, or the MPEG-2 transport stream format) which requires that each segment of content (audio content or video content) of the AV bitstream start with an I-frame, to enable seamless adaptation (e.g., splicing or switching) at segment boundaries (e.g., at the start of a segment of video content of a video elementary stream, indicated by a video I-frame, time-aligned with the start of a segment, indicated by an audio I-frame, of corresponding audio content of each of at least one audio elementary stream). In some cases, audio content of the input AV bitstream is time-aligned with corresponding video content of the input AV bitstream. In some other cases, audio content of the input AV bitstream may not be time-aligned with corresponding video content of the input AV bitstream, in the sense that a video I-frame occurs at one time in the stream (e.g., as indicated by a time stamp value) but no audio I-frame occurs at the same time in the stream, or an audio I-frame occurs at one time in the stream (e.g., as indicated by a time stamp value) but no video I-frame occurs at the same time in the stream. For example, the audio content of the stream may consist of audio I-frames only (e.g., when NBMP entity 12 is configured to generate a transport stream or other AV bitstream, in response to the input AV bitstream, in accordance with an embodiment in the below-described second class of embodiments of the inventive AV bitstream generation method).

The input AV bitstream output from source 10 is delivered over the FIG. 1 network to Network-Based Media Processing (NBMP) entity 12, which may be implemented as (or included in) a CDN Server. It is contemplated that in some embodiments, NBMP entity 12 is implemented in accordance to a standardized format. In one example, such a standard may be an MPEG compatible standard and NMBP entity 12 may be implemented as an MPEG NBMP entity, e.g., in accordance with the MPEG-I Part 8, Network Based Media Processing framework or any other future version(s) of this framework. NBMP entity 12 has an input 12A coupled to receive the input AV bitstream, a buffer 12B coupled to input 12A, a processing subsystem 12C coupled to buffer 12B, and a packaging subsystem 12D coupled to subsystem 12C. Segments of the AV bitstream delivered to input 12A are buffered (stored in a non-transitory manner) in buffer 12B. Buffered segments are asserted from buffer 12B to processing subsystem 12C (a processor). Subsystem 12C is programmed (or otherwise configured) in accordance with an embodiment of the invention to perform re-authoring on at least one frame of the input AV bitstream (thereby generating at least one re-authored frame) in a manner depending on network and/or other constraints, and to pass through to subsystem 12D any media content and metadata of the input AV bitstream which it does not modify. The media content and metadata output from subsystem 12C (e.g., original frames of the input AV bitstream and each re-authored frame generated in subsystem 12C) are provided to packaging subsystem 12D for packaging as an AV bitstream. Subsystem 12D is programmed (or otherwise configured) to generate the AV bitstream (to be delivered to playback device 16) to include each said re-authored frame (e.g., including by inserting at least one re-authored I-frame in the AV bitstream, and/or replacing at least one I-frame of the input AV bitstream with a re-authored P-frame), and performing any other packaging required (including any required metadata generation) to generate the AV bitstream to have the required format (e.g., MPEG-DASH format). The network constraints (and/or other constraints) are indicated by control bits delivered over the FIG. 1 network to NBMP entity 12 from another NBMP entity (e.g., NBMP entity 14 of FIG. 1). Examples of such constraints (e.g., a constraint indicative of available bitrate for bitstream delivery over the network) will be described below. NBMP entity 12 is configured to perform control functions to compose and configure the media processing operations (including frame re-authoring) needed to perform the implemented embodiment of the inventive method, in a manner constrained by the control bits delivered from entity 14.

Each of source 10, NBMP entity 12, NBMP entity 14, and playback device 16 of FIG. 1 is an audio/video processing unit ("AVPU") as defined herein. Each of source 10, NBMP entity 12, and playback device 16 may be configured to perform adaptation (e.g., switching or splicing) on an AV bitstream generated thereby or provided thereto, thus generating an adapted AV bitstream. An embodiment of each of source 10, NBMP entity 12, NBMP entity 14, and playback device 16 includes a buffer memory and at least one audio/video processing subsystem coupled to the buffer memory, wherein the buffer memory stores in a non-transitory manner at least one segment of an AV bitstream which has been generated by an embodiment of the inventive method for generating an AV bitstream.

NBMP entity 12 is coupled and configured to generate an AV bitstream (in response to the input AV bitstream delivered from source 10) in accordance with an embodiment of the inventive AV bitstream generation method, and to deliver the generated AV bitstream (e.g., assert to the network for delivery over the network) to a playback device 16. Playback device 16 is configured to perform playback of the audio and/or video content of the AV bitstream. Playback device 16 includes input 16A, buffer 16B coupled to input 16A, and processing subsystem 16C coupled to buffer 16B. Segments of the AV bitstream delivered to input 16A are buffered (stored in a non-transitory manner) in buffer 16B. Buffered segments are asserted from buffer 16B to processing subsystem 16C (a processor). Subsystem 16C is configured to parse the AV bitstream and perform any necessary decoding on encoded audio content and/or encoded video content of the AV bitstream, and playback device 16 may include a display for displaying parsed (or parsed and decoded) video content of the AV bitstream. Playback device 16 (e.g., subsystem 16C, or another subsystem of device 16 not specifically shown in FIG. 1) may also be configured to render parsed (and decoded) audio content of the AV bitstream to generate at least one speaker feed, and optionally includes at least one speaker for emitting sound in response to each such speaker feed.

As noted, some implementations of playback device 16 are configured to decode audio and/or video content of an AV bitstream generated in accordance with an embodiment of the invention. Thus, these implementations of device 16 are examples of a decoder configured to decode audio and/or video content of an AV bitstream generated in accordance with an embodiment of the invention.

Typically, the AV bitstream output from NBMP entity 12 has a packaged media delivery format (e.g., format in accordance with the MPEG-DASH, HLS, or MMT method/protocol, or the MPEG-2 transport stream format) which requires that each segment of content (audio content or video content) of the AV bitstream start with an I-frame. Typically, each segment of video content of a video elementary stream of the AV bitstream starts with a video I-frame (which may be a re-authored video I-frame generated in accordance with an embodiment of the invention) which is time-aligned with the start (indicated by an audio I-frame, which may be a re-authored audio I-frame generated in accordance with an embodiment of the invention) of at least one segment of corresponding audio content (of each of at least one audio elementary stream of the AV bitstream).

For example, in some embodiments, entity 12 is configured to re-author audio P-frames of the input AV bitstream as audio I-frames as needed. For example, entity 12 may identify a video I-frame in the input AV bitstream and determine that an audio I-frame, time aligned with the video I-frame, is needed. In this case, entity 12 may re-author an audio P-frame (time aligned with the video I-frame) of the input AV bitstream as an audio I-frame, and insert the re-authored audio I-frame in the AV bitstream to be delivered to playback device 16, in place of the audio P-frame.

For another example, entity 12 may be configured to identify that audio I-frames (or audio I-frames and video I-frames) of the input AV bitstream occur at a first rate (e.g., once per each time interval X, as indicated in FIG. 1), but that adaptation points (e.g., splice points) in the AV bitstream to be delivered to playback device 16 are needed at a greater rate (e.g., once per each time interval Y, as indicated in FIG. 1, where Y is greater than X). In this case, entity 12 may re-author audio P-frames (or audio P-frames, and video P-frames time aligned with the audio P-frames) of the input AV bitstream as audio I-frames (or audio I-frames, and video I-frames time aligned with the audio I-frames), and insert the re-authored audio I-frames (or each set of time aligned re-authored audio I-frames and re-authored video I-frames) in the AV bitstream to be delivered to playback device 16, in place of the original P-frames, thereby providing adaptation points in the AV bitstream at the needed rate (Y).

Other embodiments of the inventive method (which NBMP entity 12 may be configured to perform) will be described below.

Figure 2:
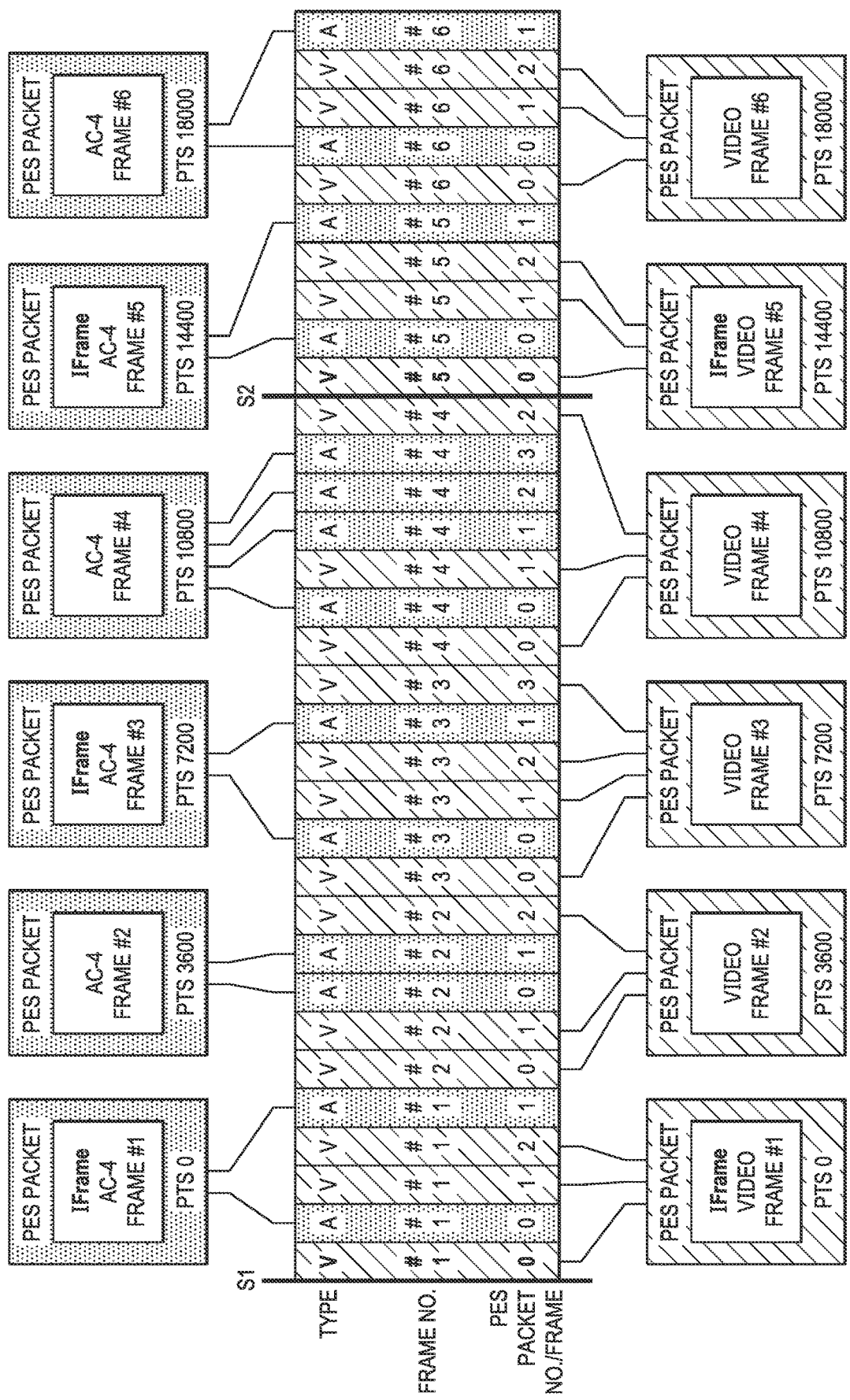
FIG. 2 is a diagram of an example of an MPEG-2 transport stream.

FIG. 2 is a diagram of an example of an MPEG-2 transport stream. Some embodiments of NBMP entity 12 of FIG. 1 (and some embodiments of below-described production unit 3 of FIG. 3) are configured to generate an MPEG-2 transport stream, including by re-authoring at least one video or audio frame.

As noted, an AV bitstream (e.g., a transport stream) generated (e.g., by NBMP entity 12 of FIG. 1, or production unit 3 of FIG. 3) in accordance with an embodiment of the invention may be indicative of at least one audio/video program ("program"), and include (for each program indicated thereby) frames of video data (which determine at least one video elementary stream) and frames of corresponding encoded audio data (which determine at least one audio elementary stream). The frames of video data (e.g., video frames #1, #2, #3, #4, #5, and #6 of FIG. 2) may include I-frames of video data (e.g., video I-frames #1 and #5 of FIG. 2), and the frames of encoded audio data (e.g., the audio frames identified as AC-4 frame #1, AC-4 frame #2, AC-4 frame #3, AC-4 frame #4, AC-4 frame #5, and AC-4 frame #6 of FIG. 2) may include I-frames of encoded audio data (e.g., audio I-frames AC-4 frame #1, AC-4 frame #3, and AC-4 frame #5 of FIG. 2).

To generate the MPEG-2 transport stream of FIG. 2, audio frames are packaged into PES packets (shown in enlarged versions in the top row of FIG. 2), and video frames are packaged into PES packets (shown in enlarged versions in the bottom row of FIG. 2). Each of the PES packets indicative of an audio frame has different one of PTS values 0, 3600, 7200, 10800, 14400, and 18000, and each of the PES packets indicative of a video frame has different one of the PTS values 0, 3600, 7200, 10800, 14400, and 18000.

Each PES packet is packaged as a set of transport stream (TS) packets, and the MPEG-2 transport stream comprises the indicated sequence of TS packets (shown in the middle row of FIG. 2). Transport stream splicers that process the transport stream can potentially splice at the positions marked with bars S1 and S2, each of which positions occurs just before a video I-Frame, and thus leave audio undisturbed. To simplify the example, all frames indicated in FIG. 2 are PES-Packet-aligned (even between I-Frames, where it is not required).

The transport stream of FIG. 2 has (i.e., satisfies) the property of I-frame synchronization (i.e., video and audio encoding are synchronized such that for each program indicated by the transport stream, for each video I-frame in a video elementary stream of the program, there is at least one matching audio I-frame (i.e., at least one audio I-frame synchronized with the video I-frame) in an audio elementary stream of the program), in the sense that, for each program indicated by the transport stream, data of the transport stream which is indicative of the program has the property of I-frame synchronization. A transport stream having this property (e.g., a transport stream generated in accordance with an embodiment of the invention) can be seamlessly spliced (e.g., by splicer 7 of FIG. 3) or otherwise adapted without modifying any audio elementary stream of any program of the transport stream.

FIG. 3 is a block diagram of an example of an audio processing chain (audio data processing system), in which one or more of the elements of the system may be configured in accordance with an embodiment of the present invention. The system includes the following elements, coupled together as shown: capture unit 1, production unit 3 (which includes an encoding subsystem), delivery subsystem 5, and splicing unit (splicer) 7, and optionally also capture unit 1', production unit 3' (which includes an encoding subsystem), and delivery subsystem 5'. In variations on the system shown, one or more of the elements are omitted, or additional processing units are included (e.g., subsystem 5' is omitted and the output of unit 3' is delivered to unit 7 by subsystem 5).

Capture unit 1 is typically configured to generate PCM (time-domain) samples comprising audio content, and video data samples, and to output the PCM audio samples and video data samples. For example, the PCM samples may be indicative of multiple streams of audio captured by microphones. Production unit 3, typically operated by a broadcaster, is configured to accept the PCM audio samples and video samples as input, and to generate and output an AV bitstream indicative of the audio and video content. In some implementations of the FIG. 3 system, production unit 3 is configured to output an MPEG-2 transport stream (e.g., an MPEG-2 transport stream whose audio content is encoded in accordance with the AC-4 standard, so that each audio elementary stream of the MPEG-2 transport stream comprises compressed audio data having AC-4 format).

The encoding performed on the audio content of an AV bitstream (e.g., an MPEG-2 transport stream) generated in accordance with any of various embodiments of the invention may be AC-4 encoding, or it may be any other audio encoding that is frame-aligned with video (i.e. so that each frame of video corresponds to an integer (i.e., non-fractional) number of frames of encoded audio (AC-4 encoding can be performed so as to have this latter property).

The AV bitstream output from unit 3 may include an encoded (e.g., compressed) audio bitstream (sometimes referred to herein as a "main mix") indicative of at least some of the audio content, and a video bitstream indicative of the video content, and optionally also at least one additional bitstream or file (sometimes referred to herein as a "side mix") indicative of some of the audio content. The data of the AV bitstream (and of each generated side mix, if any is generated) that are indicative of the audio content are sometimes referred to herein as "audio data."

Audio data of the AV bitstream (e.g., the main mix thereof) may be indicative of one or more sets of speaker channels, and/or streams of audio samples indicative of object channels.

As shown in FIG. 4, an implementation of production unit 3 of FIG. 3 includes an encoding subsystem 3B which is coupled to receive video and audio data from unit 1. Subsystem 3B is configured to perform necessary encoding on the audio data (and optionally also on the video data) to generate frames of encoded audio data and optionally also frames of encoded video data. Re-authoring and multiplexing subsystem 3C of unit 3 (of FIG. 4) has an input 3D coupled to receive frames (e.g., audio frames, or audio frames and video frames) of data output from subsystem 3B, and a subsystem (a processor) coupled to the input and configured to re-author one or more of the frames output from subsystem 3B as needed to implement an embodiment of the invention, and to package (including by packetizing and multiplexing) the output of subsystem 3B (or frames of the output of subsystem 3B, and each re-authored frame that it generates to replace one of the frames output from subsystem 3B) as an AV bitstream in accordance with an embodiment of the invention. For example, the AV bitstream may be an MPEG-2 transport stream, whose audio content may be encoded in accordance with the AC-4 standard so that each audio elementary stream of the MPEG-2 transport stream comprises compressed audio data having AC-4 format). Buffer 3A is coupled to an output of subsystem 3C. Segments of the AV bitstream generated in subsystem 3C are buffered (stored in a non-transitory manner) in buffer 3A. Since the output of subsystem 3C of unit 3 is an AV bitstream including encoded audio content generated in unit 3 (and typically also video content packaged therewith), unit 3 is an example of an audio encoder. The AV bitstream generated by unit 3 is typically asserted (after buffering in buffer 3A) to a delivery system (e.g., delivery subsystem 5 of FIG. 3).

Delivery subsystem 5 of FIG. 3 is configured to store and/or transmit (e.g., broadcast or deliver over a network) the transport bitstream generated by unit 3 (e.g., including each side mix thereof, if any side mix is generated).

Capture unit 1', production unit 3' (including buffer 3A'), and delivery subsystem 5' perform the functions of (and are typically identical to) capture unit 1, production unit 3, and delivery subsystem 5', respectively. They may operate to generate (and deliver to input 8B of splicer 7) a second AV bitstream (e.g., a transport stream or other AV bitstream generated in accordance with an embodiment of the invention), to be spliced by splicer 7 with a first AV bitstream (e.g., a first transport stream or other AV bitstream) which is generated (e.g., in accordance with an embodiment of the invention) in production unit 3 and delivered to input 8A of splicer 7.

Splicer 7 of FIG. 3 includes inputs 8A and 8B. Input 8A is coupled to receive (e.g., read) at least one AV bitstream delivered to splicer 7 by delivery subsystem 5, and input 8B is coupled to receive (e.g., read) at least one AV bitstream delivered to splicer 7 by delivery subsystem 5'. Splicer 7 also includes buffer memory (buffer) 7A, buffer memory (buffer) 7D, parsing subsystem 7E, parsing subsystem 7B, and splicing subsystem 7C, coupled as shown in FIG. 3. Optionally, splicer 7 includes a memory 9 which is coupled (as shown) and configured to store an AV bitstream to be spliced. During typical operation of splicer 7, segments of at least one selected AV bitstream received at input 8A and/or 8B (e.g., a sequence of segments of a selected sequence of AV bitstreams received at inputs 8A and 8B) are buffered (stored in a non-transitory manner) in buffer 7A and/or buffer 7D. Buffered segments are asserted from buffer 7A to parsing subsystem 7B for parsing, and buffered segments are asserted from buffer 7D to parsing subsystem 7E. Alternatively, segments of at least one AV bitstream stored in memory 9 are asserted to parsing subsystem 7B for parsing (or segments of a selected sequence of AV bitstreams stored in memory 9 and/or received at input 8A are asserted from buffer 7A and/or memory 9 to parsing subsystem 7B for parsing). Typically, each AV bitstream to be parsed (in subsystem 7B or 7E) and spliced (in splicing subsystem 7C) has been generated in accordance with an embodiment of the invention.

Splicer 7 (e.g., subsystems 7B and 7E and/or subsystem 7C thereof) is also coupled and configured to determine splice points in each AV bitstream to be spliced (e.g., a first transport stream delivered to splicer 7 by delivery subsystem 5 and/or a second transport stream delivered to splicer 7 by delivery subsystem 5', or a first transport stream stored in memory 9 and/or a second transport stream delivered to splicer 7 by delivery subsystem 5 or 5') and subsystem 7C is configured to splice the stream(s) to generate at least one spliced AV bitstream (the "spliced output" of FIG. 3). In some cases, the splice omits a segment of a single AV bitstream, and splicer 7 is configured to determine an out point (i.e., a time) of the AV bitstream and an in point (a later time) of the AV bitstream, and to generate the spliced AV bitstream by concatenating the stream segment occurring prior to the out point with the stream segment occurring after the in point. In other cases, the splice inserts a second AV bitstream between segments of a first AV bitstream (or between segments of first AV bitstream and a third AV bitstream), and splicer 7 is configured to determine an out point (i.e., time) of the first AV bitstream, an in point (a later time) of the first (or third) AV bitstream, an in point (i.e., a time) of the second AV bitstream, and an out point (a later time) of the second AV bitstream, and to generate a spliced AV bitstream which includes data of the first AV bitstream occurring prior to that stream's out point, data of the second AV bitstream occurring between that stream's in point and out point, and data of the first (or third) AV bitstream occurring after the first (or third) AV bitstream's in point.

In some implementations, splicer 7 is configured to splice AV bitstream(s), at least one of which has been generated in accordance with an embodiment of the invention, in accordance with an embodiment of the inventive splicing method to generate the at least one spliced AV bitstream (the "spliced output" of FIG. 3). In such embodiment of the inventive splicing method, each splice point (e.g. in point or out point) occurs at an audio I-frame (which may be a re-authored frame generated in accordance with an embodiment of the invention) of a segment of audio content, aligned with a video I-frame (which may be a re-authored frame generated in accordance with an embodiment of the invention) of a corresponding segment of video content. Typically, each such segment of audio content includes at least one audio P-frame subsequent to the audio I-frame, and each such segment of video content includes at least one video P-frame subsequent to the video I-frame.

Some embodiments of the invention relates to a method for adapting (e.g., splicing or switching) an AV bitstream (e.g., an MPEG-2 transport stream) generated in accordance with any embodiment of the inventive method for generating an AV bitstream, thereby generating an adapted (e.g., spliced) AV bitstream (e.g., the output of an implementation of splicer 7 of FIG. 3 which is configured to perform such splicing method). In typical embodiment, the adapting is performed without modifying any encoded audio elementary stream of the AV bitstream (although in some cases, the adapter may need to perform re-multiplexing or other modification of the AV bitstream, in a manner which does not include modification of the data of any encoded audio elementary stream of the AV bitstream).

Typically, a playback system would decode and render a spliced AV bitstream output from splicer 7. The playback system would typically include a subsystem for parsing the audio content and the video content of the AV bitstream, a subsystem configured to decode and render the audio content, and another subsystem configured to decode and render the video content.

Figure 7:
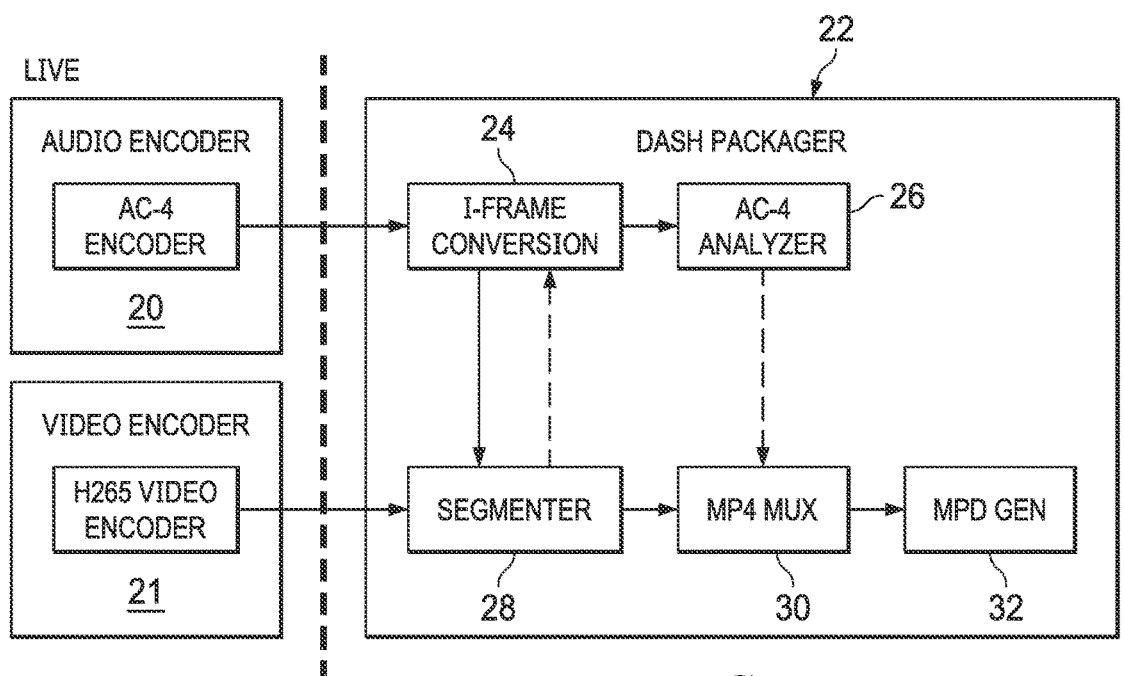
FIG. 7 is a block diagram of a system for generating an AV bitstream having MPEG-DASH format in accordance with an embodiment of the invention.

FIG. 7 is a block diagram of a system for generating an AV bitstream having MPEG-DASH format in accordance with an embodiment of the invention. In the system of FIG. 7, audio encoder 20 is coupled to receive audio data (e.g., from an embodiment of unit 1 of FIG. 4 or another capture unit), and video encoder 21 is coupled to receive video data (e.g., from an embodiment of unit 1 of FIG. 4 or another capture unit). Encoder 20 is coupled and configured to perform audio encoding (e.g., AC-4 encoding) on the audio data to generate frames of encoded audio data, and to assert the frames to DASH packager 22. Encoder 21 is coupled and configured to perform video encoding (e.g., H265 video encoding) on the video data to generate frames of encoded video audio data, and to assert the frames to DASH packager 22.

Packager 22 is an audio/video processing unit including I-frame conversion subsystem 24, segmenter 28, audio analyzer 26, MPEG-4 multiplexer 30, and MPD generation subsystem 32, coupled as shown.

Segmenter 28 is a video processing subsystem (a processor) programmed (or otherwise configured) to determine segments of the video content (video frames) provided to segmenter 28 from encoder 21, and to provide the segments to MPEG-4 multiplexer 30. Typically, each of the segments starts with a video I-frame.

I-frame conversion subsystem 24 is an audio processing subsystem (a processor) programmed (or otherwise configured) in accordance with an embodiment of the invention to perform re-authoring on at least one audio frame provided to subsystem 24 from encoder 20 (thereby generating at least one re-authored frame), and to pass through to audio analyzer 26 any of the frames (output from encoder 20) which it does not modify. Typically, subsystem 24 performs re-authoring so as to ensure that there is an audio I-frame (e.g., a re-authored I-frame) aligned with each video I-frame identified by segmenter 28. The audio content and metadata output from subsystem 24 (i.e., original audio frames output from encoder 20 and each re-authored audio frame generated in subsystem 24) are provided to audio analyzer 26.

The audio frames output from subsystem 24 (e.g., original audio frames from encoder 20 and each re-authored audio frame generated in subsystem 24) are provided to audio analyzer 26. Typically, the audio frames include AC-4 encoded audio data. Analyzer 26 is configured to analyze metadata of the frames (e.g., AC-4 metadata) and, using results of the analysis, to generate any new metadata that it determines to be required for packaging (in MPEG-4 multiplexer 30) with the audio frames. The audio frames output from subsystem 24 and any new metadata generated in analyzer 26 are provided to MPEG-4 multiplexer 30.

MPEG-4 multiplexer 30 is configured to multiplex the audio frames output from analyzer 26 (and any new metadata generated in analyzer 26) and the video frames output from segmenter 28, to generate multiplexed audio and video content (and metadata) in MPEG-4 file format for inclusion in an AV bitstream having MPEG-DASH format.

MPD generation subsystem 32 is coupled to receive the multiplexed content output from multiplexer 30 and configured to generate an AV bitstream having MPEG-DASH format (and indicative of a MPEG-DASH Media Presentation) which includes the multiplexed content and metadata.

In some embodiments for generating an AV bitstream (e.g., an AV bitstream having MPEG-H format or MPEG-D USAC format), the step of re-authoring an audio P-frame as a re-authored audio I-frame is performed as follows. At least one previous audio P-frame is copied into the P-frame (e.g., in an extension payload of the P-frame). Thus, the resulting re-authored I-frame includes encoded audio content of each previous P-frame, and the resulting re-authored I-frame includes a different set of metadata than the P-frame (i.e., it includes metadata of each previous P-frame as well as the original metadata of the P-frame). In one example, such copying of at least one previous P-frame into a P-frame may be performed using the AudioPreRoll( ) syntax element described in Section 5.5.6 ("Audio Pre-Roll") of the MPEG-H standard. It is contemplated that some implementations of subsystem 24 of FIG. 7 perform re-authoring of P-frames (as re-authored I-frames) in this way.

In some embodiments, the inventive method includes: (a) providing frames (e.g., transmitting, delivering, or otherwise providing the frames, or an input transport stream or other input AV bitstream including the frames, to an encoder (e.g., an embodiment of subsystem 3C of production unit 3 of FIG. 4) or an NBMP entity (e.g., an embodiment of NBMP entity 12 of FIG. 1), or generating the frames (e.g., in an embodiment of production unit 3 of FIG. 4)), where each of the frames is indicative of audio content or video content, and where the frames include frames of a first decoding type; and (b) generating an AV bitstream (e.g., by operation of an embodiment of unit 3 of FIG. 4 on frames generated thereby, or by operation of an embodiment of NBMP entity 12 of FIG. 1 on frames of an input AV bitstream provided thereto) including by re-authoring at least one of the frames of the first decoding type as a re-authored frame of a second decoding type different than the first decoding type (e.g., the re-authored frame is an I-frame if said one of the frames of the first decoding type is a P-frame, or the re-authored frame is a P-frame if said one of the frames of the first decoding type is an I-frame), such that the AV bitstream includes a segment of the content which includes the re-authored frame, and the segment of content starts with an I-frame and includes at least one P-frame following the I-frame. For example, step (b) may include a step of re-authoring at least one audio P-frame so that the re-authored frame is an audio I-frame, or re-authoring at least one audio I-frame so that the re-authored frame is an audio P-frame, or re-authoring at least one video P-frame so that the re-authored frame is a video I-frame, or re-authoring at least one video I-frame so that the re-authored frame is a video P-frame. In some such embodiments, step (a) includes steps of: in a first system (e.g., an embodiment of production unit 3 of FIG. 4 or source 10 of FIG. 1), generating an input AV bitstream which includes the frames indicative of the content; and delivering (e.g., transmitting) the input AV bitstream to a second system (e.g., an embodiment of NBMP entity 12 of FIG. 1); and step (b) is performed in the second system.

In some such embodiments, at least one audio P-frame (including metadata and encoded audio data) is re-authored as an audio I-frame (including the same encoded audio data, and different metadata). The encoded audio data may be AC-4 encoded audio data. For example, in some embodiments of the invention, an audio P-frame is re-authored as a re-authored audio I-frame by replacing all or some of the audio P-frame's metadata (which may be in a header of the audio P-frame) with a different set of metadata (e.g., a different set of metadata consisting of or including metadata copied from, or generated by modifying metadata obtained from, a preceding audio I-frame) without modifying the encoded audio content of the frame (e.g., without modifying the encoded audio content by decoding such content and then re-encoding the decoded content). In some other ones of the embodiments, at least one audio I-frame (including metadata and encoded audio data) is re-authored as an audio P-frame (including the same encoded audio data, and different metadata). This encoded audio data may be AC-4 encoded audio data.

AC-4 encoded audio data of an audio P-frame (whose audio content is the AC-4 encoded audio data) can be decoded using information only from within the P-frame, although in some cases (i.e., when the encoding assumed that spectral extension metadata and/or coupling metadata from a prior I-frame would be available to decode the encoded audio data), upon playback the decoded audio will not sound exactly as originally intended at the time of the original encoding. In these cases, in order for a decoded version of the P-frame's encoded audio content to sound as originally intended upon playback, the spectral extension metadata (and/or coupling metadata) from the prior I-frame typically would typically need to available for use (and typically would need to be used) during the decoding. An example of such spectral extension metadata is ASPX metadata, and an example of such coupling metadata is ACPL metadata.

Thus, in some embodiments of the invention, the re-authoring of an audio P-frame (e.g., an audio P-frame whose audio content is AC-4 encoded audio data) to generate a re-authored audio I-frame (without modifying the P-frame's audio content) is performed by copying metadata from a prior audio I-frame and inserting the copied metadata in place or all or some of the P-frame's original metadata. This type of re-authoring will typically be performed when the original encoding of the P-frame does not require that both specific metadata (e.g., spectral extension metadata and/or coupling metadata) from a prior I-frame, and corresponding metadata from the P-frame itself, be available in order to decode the P-frame's (and thus the re-authored I-frame's) encoded audio data (in a manner that will not result in unacceptable altering of the originally intended sound upon playback of the decoded audio). However, in cases in which the original encoding of a P-frame (e.g., an audio P-frame whose audio content is AC-4 encoded audio data) does require that both specific metadata (e.g., spectral extension metadata and/or coupling metadata) from a prior I-frame, and corresponding metadata from the P-frame itself, be available to decode the P-frame's encoded audio data (in a manner that will not result in unacceptable altering of the originally intended sound upon playback of the decoded audio), re-authoring of the P-frame (as a re-authored audio I-frame) in accordance with some embodiments of the invention includes steps of saving the specific metadata (e.g., spectral extension metadata and/or coupling metadata) from a prior audio I-frame, modifying the saved metadata (thereby generating modified metadata which is sufficient, when included in the re-authored I-frame, to enable decoding of the P-frame's (and thus the I-frame's) encoded audio data using information only from within the re-authored I-frame), typically using at least some of the original metadata of the P-frame, and inserting the modified metadata in place of all or some of the P-frame's original metadata. Similarly, it is contemplated that re-authoring of a video P-frame (as a re-authored video I-frame) in accordance with some embodiments of the invention includes steps of saving specific metadata from a prior video I-frame, modifying the saved metadata (thereby generating modified metadata which is sufficient, when included in the re-authored I-frame, to enable decoding of the P-frame's (and thus the I-frame's) video content using information only from within the re-authored I-frame), e.g., using at least some of the original metadata of the P-frame, and inserting the modified metadata in place of all or some of the P-frame's original metadata.

Alternatively, encoding of each P-frame (which may be re-authored in accordance with an embodiment of the invention) is performed in such a manner that metadata from another frame (e.g., a prior I-frame) can simply be copied from the other frame (without modifying the copied metadata) into the P-frame to replace original metadata of the P-frame (thereby re-authoring the P-frame as an I-frame) to enable decoding of the P-frame's (and thus the re-authored I-frame's) content (audio or video content) in a manner that does result in an unacceptable perceived difference (from what was intended at the time of encoding) upon playback of the decoded content. For example, AC-4 encoding of audio data (of frames which may be re-authored in accordance with an embodiment of the invention) may be performed without including spectral extension metadata and/or coupling metadata in the resulting audio frames. This allows the re-authoring of an audio P-frame (one which has been generated as in the example), thereby generating a re-authored audio I-frame (without modifying the P-frame's audio content), by copying metadata from a prior audio I-frame and inserting the copied metadata in place or all or some of the P-frame's original metadata. In the example, the need to modify (re-encode) metadata from a prior I-frame (in order to re-author a P-frame) is circumvented in the encoder by not exploiting inter-channel dependencies at the cost of a slightly higher bitrate.

In a first class of embodiments (sometimes referred to herein as embodiments implementing "Method 1"), the inventive method includes steps of: (a) generating (e.g., in a conventional manner) audio I-frames and audio P-frames indicative of content (e.g., in subsystem 3B of an embodiment of production unit 3 of FIG. 4); and (b) generating an AV bitstream (e.g., in subsystem 3C of an embodiment of production unit 3 of FIG. 4) including by re-authoring at least one of the audio P-frames as a re-authored audio I-frame, so that the AV bitstream includes a segment of the content which includes the re-authored audio I-frame, and the segment of the content starts with the re-authored audio I-frame. Typically, the segment of the content also includes at least one of the audio P-frames following the re-authored audio I-frame. Steps (a) and (b) may be performed in an audio encoder (e.g., a production unit including or implementing an audio encoder), including by operating the audio encoder to perform step (a).

In some embodiments which implement Method 1, step (a) is performed in an audio encoder (e.g., in subsystem 3B, implemented as an AC-4 encoder, of production unit 3 of FIG. 4) which generates the audio I-frames and the audio P-frames, step (b) includes re-authoring of at least one of the audio P-frames (corresponding to a time at which an audio I-frame is needed) as the re-authored audio I-frame, and step (b) also includes a step of including the re-authored audio I-frame in the AV bitstream instead of said one of the audio P-frames.

Some embodiments which implement Method 1 include steps of: in a first system (e.g., a production unit or an encoder, for example, an embodiment of production unit 3 of FIG. 4, or the system of FIG. 7), generating an input AV bitstream which includes the audio I-frames and the audio P-frames generated in step (a); delivering (e.g., transmitting) the input AV bitstream to a second system (e.g., an embodiment of NBMP entity 12 of FIG. 1); and performing step (b) in the second system. Typically, the step of generating the input AV bitstream includes packaging of encoded audio content (indicated by the audio I-frames and the audio P-frames generated in step (a)) and video content together to generate the input AV bitstream, and the AV bitstream generated in step (b) includes said encoded audio content packaged with said video content. In some embodiments which implement Method 1, at least one audio frame of the AV bitstream is a re-authored audio I-frame (but no video frame of the AV bitstream is a re-authored frame), and a segment of audio content of the AV bitstream starts with the re-authored audio I-frame (aligned with a video I-frame of a corresponding segment of video content of the AV bitstream) and includes at least one subsequent audio P-frame.

In a second class of embodiments (sometimes referred to herein as embodiments implementing "Method 2"), the inventive method includes steps of: (a) generating (e.g., in a conventional manner) audio I-frames indicative of content (e.g., in subsystem 3B of an embodiment of production unit 3 of FIG. 4); and (b) generating (e.g., in subsystem 3C of an embodiment of production unit 3 of FIG. 4) an AV bitstream including by re-authoring at least one of the audio I-frames as a re-authored audio P-frame, so that the AV bitstream includes a segment of the content which includes the re-authored audio P-frame, and the segment of the content starts with one of the audio I-frames generated in step (a). Steps (a) and (b) may be performed in an audio encoder (e.g., a production unit including or implementing an audio encoder), including by operating the audio encoder to perform step (a).

In some embodiments which implement Method 2, step (a) is performed in an audio encoder (e.g., in subsystem 3B, implemented as an AC-4 encoder, of production unit 3 of FIG. 4) which generates the audio I-frames, and step (b) includes re-authoring each of the audio I-frames which corresponds to a time other than a segment boundary (and thus does not occur at a segment boundary), thereby determining at least one re-authored audio P-frame, and the step of generating the AV bitstream includes a step of including the at least one re-authored audio P-frame in the AV bitstream.

Some embodiments which implement Method 2 include steps of: in a first system (e.g., a production unit or encoder, for example, an embodiment of production unit 3 of FIG. 4, or the system of FIG. 7), generating an input AV bitstream which includes the audio I-frames generated in step (a); delivering (e.g., transmitting) the input AV bitstream to a second system (e.g., an embodiment of NBMP entity 12 of FIG. 1); and performing step (b) in the second system. Typically, the step of generating the input AV bitstream includes packaging of encoded audio content (indicated by the audio I-frames generated in step (a)) and video content together to generate the input AV bitstream, and the AV bitstream generated in step (b) includes said encoded audio content packaged with said video content. In some embodiments, at least one audio frame (but no video frame) of the AV bitstream has been re-authored (as a re-authored audio P-frame) so that a segment of audio content which includes the re-authored audio P-frame starts with an audio I-frame (aligned with a video I-frame of a corresponding segment of video content) and includes at least one re-authored audio P-frame after the audio I-frame.

In a third class of embodiments (sometimes referred to herein as embodiments implementing "Method 3"), the inventive AV bitstream generation method includes generation (or provision) of hybrid frames that allow for inclusion in the AV bitstream of a P-frame including by selecting (or otherwise using) a data "chunk." As used herein, a data "chunk" may be or include data of one of the hybrid frames, or data of at least one sequence (e.g., two substreams) of frames indicative of the hybrid frames, or a predefined part of said at least one sequence (e.g., in the case of frames including AC-4 encoded audio data, an entire substream may comprise a whole data chunk). In one example, Method 3 includes generating the hybrid frames so as to ensure that adjacent frames of the AV bitstream match. In typical embodiments, an encoder generates the hybrid frames (e.g., streams indicative of the hybrid frames) without double processing, as much of the processing is required just once. In some embodiments, a hybrid frame contains one instance of common data for a P-frame and an I-frame. In some embodiments, a packager may synthesize an I-frame or a P-frame from at least one chunk of data of a hybrid frame (or of a sequence of frames indicative of hybrid frames including the hybrid frame), e.g. where the chunk does not comprise an entire I-frame or P-frame.

Figure 6:
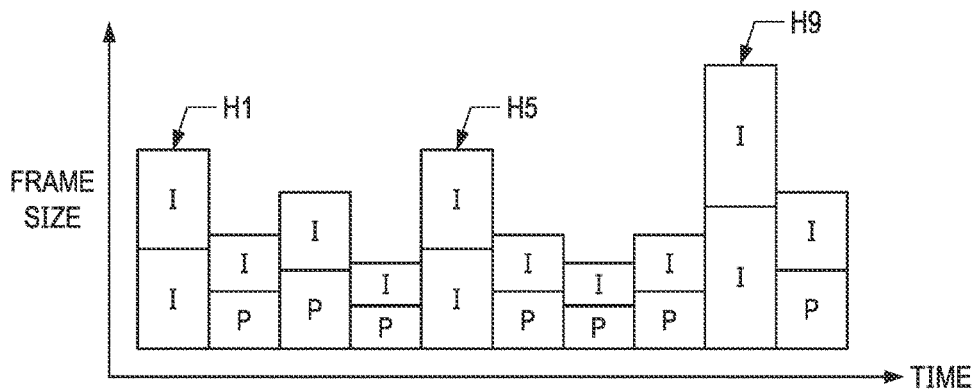
FIG. 6 is a diagram of hybrid frames generated in accordance with an embodiment of the invention.
Figure 6A:
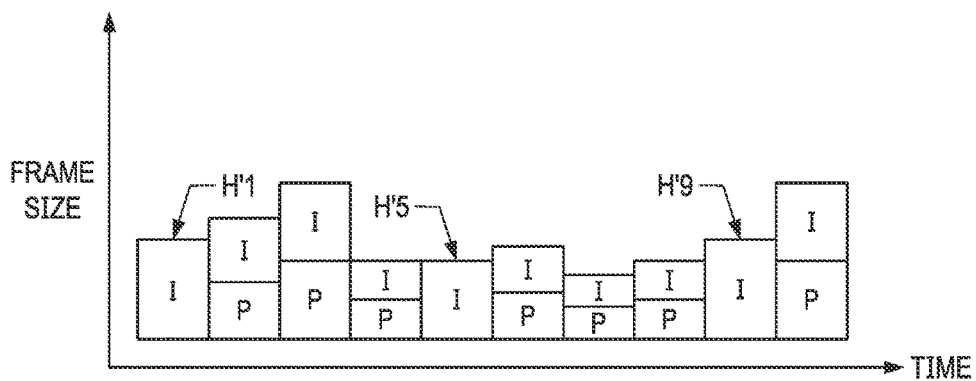
FIG. 6A is a diagram of hybrid frames generated in accordance with an embodiment of the invention.

For example, FIG. 6 is a diagram of a set of ten hybrid frames, and FIG. 6A is a diagram of another set of ten such hybrid frames. In typical embodiments of Method 3, hybrid frames (e.g., those of FIG. 6, or those of FIG. 6A) are generated by an implementation of an encoder (e.g., audio encoder 20 of FIG. 7), and a packager (e.g., an implementation of packager 22 of FIG. 7) generates the AV bitstream including by selecting at least one P-frame of at least one of the hybrid frames.

With reference to FIGS. 6 and 6A, in some embodiments, each hybrid frame may comprise:

two copies of an I-frame. For example, each of hybrid frames H1, H5, and H9 of FIG. 6 includes two copies of an I-frame (both labeled "I"); or one I-frame. For example, each of hybrid frames H'1, H'S, and H'9 of FIG. 6A consists of one I-frame (labeled "I"); or one I-frame (including encoded audio data and metadata) and one P-frame (including the same encoded audio data but different metadata). For example, each hybrid frame of FIG. 6, other than frame H1, H5, or H9, and each hybrid frame of FIG. 6A, other than frame H'1, H'5, and H'9, includes such an I-frame (labeled "I") and such a P-frame (labeled "P").

With hybrid frames (e.g., of the type shown in the FIG. 6 example, or the FIG. 6A example), when the packager (or other AV bitstream generation system, which may be a subsystem of another system) determines that an I-frame should be included at one time (in the AV bitstream being generated), it may select an I-frame from one hybrid frame (which has been previously generated by the encoder and is available for selection) corresponding to the relevant time. When the system determines that a P-frame should be included at one time (in the AV bitstream being generated), it may either: select a P-frame from one hybrid frame corresponding to the relevant time (if the hybrid frame includes a P-frame); or re-author an I-frame of such hybrid frame as a re-authored P-frame. In some embodiments, the re-authoring may include copying metadata from another hybrid frame, or modification of metadata obtained from a preceding frame.

In some implementations of an encoder (or other system or device) which generates hybrid frames including AC-4 encoded audio (e.g., hybrid frames of an AC-4 encoded audio substream) in accordance with Method 3, the encoder (or other system or device) may include metadata of the following types in each hybrid frame (or at least some hybrid frames):

ASF (audio spectral frontend) metadata. If constant bitrate is not required, then the entire sf_info and sf_data section is the same in both the I-frame and the P-frame of a hybrid frame. If constant bitrate is required, then the sf_data section of the I-frame may compensate for the I-frame size overhead and be smaller so that the entire I-frame has the same size as the corresponding P-frame. In both cases the sf_info section is identical to make sure that window shapes match perfectly;

ASPX (spectral extension) metadata. An I-frame of a hybrid frame contains an aspx_config which matches the aspx_config of a P-frame of the hybrid frame. The aspx_data of the I-frame only uses intra-frame coding whereas the aspx_data of the P-frame can use either intra-frame coding or inter-frame coding. This typically poses no additional overhead to the encoder as the encoder typically performs both methods in order to select the one which is most bitrate efficient; and ACPL (coupling) metadata. An I-frame of a hybrid frame contains an acpl_config which matches the acpl_config of a P-frame of the hybrid frame. The acpl_framing_data are identical in the P-frame and I-frame. All instances of acpl_ec_data of the I-frame are restricted to diff type=DIFF_FREQ (intra-frame coding only).

In some embodiments, an encoder (or other system or device), which generates hybrid frames including AC-4 encoded audio (e.g., hybrid frames of an AC-4 encoded audio substream) in accordance with Method 3, can produce both frame types (e.g., a stream of I-frame and stream of corresponding P-frames) in a single process. For parametric coding tools like ASPX or ACPL both inter-frame coding and intra-frame coding is generated from the same set of data. Some components (e.g., conventional components) are configured to generate the two sets of data (a set of I-frames and a set of corresponding P-frames) and decide later which uses less bits. Intra-frame coded audio is always included in a hybrid frame which includes an I-frame.

In an encoder (or other system or device), which generates hybrid frames in accordance with Method 3, other analysis tools (e.g. the frame generator in ASPX or the blockswitching decider in ASF) may run only once. For perfect match the results and decisions are used in both I-frames and corresponding P-frames.

The bitrate and buffer control may also run just once (when generating a stream of P-frames that allows inter-frame coding). The results may be used also for the all I-frame stream that is also generated. In order to prevent audio quality drops, the overhead of the I-frames may be considered when determining the target bits for the ASF coding of the P-frames.

A sequence of hybrid frames (e.g., determined by a sequence of I-frames and a sequence of corresponding P-frames) generated for implementing Method 3 may have an AC-4 Metadata TOC (table of contents) format or some other wrapper that combines I-frames and corresponding P-frames in a single stream.

In another embodiment of the invention each frame in a sequence of hybrid frames contains a header, which may be independent of the underlying media format, and which contains a description how to generate an I-frame or a P-frame from the data provided in such hybrid frame. The description may contain one or multiple commands for synthesizing an I-frame by copying ranges of data or by deleting ranges of data from the hybrid frame. The description may also contain one or multiple commands for synthesizing a P-frame by copying ranges of data or by deleting ranges of data from the hybrid frame. The packager can then synthesize an I-frame or a P-frame without the knowledge of the underlying media format by following the instruction in the header of such a hybrid frame. For example, a Hint-Track in an ISOBMFF can be used.

In one frame selection implementation, an encoder generates a stream of P-frames and a stream of corresponding I-frames at the same time (so that both streams together determine a sequence of hybrid frames). If a buffer model requirement needs to be met, then the frames of each pair of corresponding frames (each I-frame and the P-frame corresponding thereto) have equal frame size. A multiplexer chooses a frame from an all I-frame stream (output from the encoder) whenever an I-frame is required. It may choose a P-frame (e.g. from an all P-stream from the encoder) if an I-frame is not required for multiplexing. A benefit of a frame replacement implementation is that the multiplexer has lowest complexity. A disadvantage is double bandwidth on the link from the encoder to the multiplexer.

In another frame selection (chunk replacement) implementation, the hybrid frames available to the multiplexer include I-frames, corresponding P-frames ("I-frame replacement" chunks of data) and instructions for I-frame replacement (selection of one or more P-frames in place of corresponding I-frame(s)). This method requires the selection of I-frame replacement chunks of data which are not byte aligned and may require bit-shifting of large portions of the existing P-frame data in the replacement process.

In some embodiments, a method for generating an AV bitstream (which implements Method 3) includes steps of:

(a) providing frames, where at least one of the frames is a hybrid frame including a P-frame and an I-frame, where the I-frame is indicative of an encoded version of content and the P-frame is indicative of a differently encoded version of the content, and where each of the frames is indicative of audio content or video content; and (b) generating an AV bitstream, including by selecting the P-frame of at least one said hybrid frame, and including each selected P-frame in the AV bitstream, such that the AV bitstream includes a segment which starts with an I-frame and includes at least said selected P-frame following the I-frame.

Step (a) may include generation (e.g., in an implementation of encoder 20 of FIG. 7) of a first sequence of I-frames (e.g., an all I-frame stream) indicative of an encoded version of content and a second sequence of P-frames (e.g., an all P-frame stream) indicative of a differently encoded version of the content, and wherein at least one said hybrid frame includes one of the I-frames of the first sequence and one of the P-frames of the second sequence.

In some embodiments, a method for generating an AV bitstream (which implements Method 3) includes steps of:

(a) providing frames, where at least one of the frames is a hybrid frame including at least one chunk of data useful for determining a P-frame and an I-frame, where the I-frame is indicative of an encoded version of content and the P-frame is indicative of a differently encoded version of the content, and where each of the frames is indicative of audio content or video content; and (b) generating an AV bitstream, including by synthesizing at least one I-frame or P-frame using at least one said chunk of data of at least one said hybrid frame (the at least one chunk of data may, or may not, comprise an entire I-frame or P-frame), thereby generating at least one synthesized frame, and including each said synthesized frame in the AV bitstream, such that the AV bitstream includes a segment which starts with an I-frame and includes at least one synthesized P-frame following the I-frame, or starts with a synthesized I-frame and includes at least one P-frame following the synthesized I-frame. Examples of step (b) include synthesizing the at least one P-frame (or I-frame) from at least one chunk of data of one hybrid frame, or from at least one chunk of data of a sequence of frames indicative of at least two hybrid frames. In some embodiments, at least one said hybrid frame contains at least one instance of a chunk of common data (for a P-frame and an I-frame).

Some embodiments of the inventive method of generating an AV bitstream (e.g., including by re-authoring of at least one frame of an input AV bitstream) are implemented so that the AV bitstream satisfies at least one currently underlying network constraint or other constraint (e.g., generation of the AV bitstream includes re-authoring of at least one frame of an input bitstream, and is performed such that the AV bitstream satisfies at least one currently underlying network constraint on the input bitstream). For instance, when the AV bitstream is generated by an NBMP entity (e.g., NBMP entity 12 of FIG. 1, implemented as an MPEG NBMP entity, e.g., one which is or is included in a CDN server), the NBMP entity may be implemented to insert I-frames in or remove I-frames from the AV bitstream in a manner depending on network and/or other constraints. For example, the network constraints (and/or other constraints) may be indicated by control bits delivered (e.g., over the FIG. 1 network) to the NBMP entity (e.g., NBMP entity 12 of FIG. 1) from another NBMP entity (e.g., NBMP entity 14 of FIG. 1). Examples of such constraints include but are not limited to available bitrate, needed tune-in time into a program, and/or segment duration of an underlying MPEG-DASH or MMT AV bitstream.

In one exemplary embodiment of this type, an input AV bitstream (e.g., an input transport stream generated by source 10 of FIG. 1) has a bitrate, R (e.g., R=96 kbits/second), and includes adaptation points (e.g., splice points). For example, the adaptation splice points are determined by occurrence, once every 2 seconds or at some other rate, of a video I-frame and a corresponding audio I-frame of the input AV bitstream. An embodiment of the inventive method is performed (e.g., by operation of NBMP entity 12 of FIG. 1) to generate an AV bitstream in response to the input AV bitstream. If the available bitrate for delivery of the generated AV bitstream is the bitrate, R (e.g., as indicated by bits delivered to NBMP entity 12 from NBMP entity 14 of FIG. 1), and if generation of the AV bitstream includes re-authoring of P-frames(s) of the input AV bitstream to insert a new adaptation point in the generated AV bitstream (e.g., by re-authoring a P-frame of the input stream as an I-frame having more metadata bits than did the P-frame, and including the I-frame in the generated stream in place of the P-frame), such insertion of a new adaptation point could undesirably increase the bitrate required for delivery of the generated AV bitstream unless compensatory action is taken. Thus, in the exemplary embodiment, generation of the AV bitstream (e.g., by operation of NBMP entity 12 of FIG. 1) also includes steps of re-authoring of at least one I-frame of the input AV bitstream as a P-frame (having fewer metadata bits than did the I-frame) and including each re-authored P-frame in the generated AV bitstream in place of each I-frame, thus reducing the bitrate required to deliver the generated AV bitstream so as not to exceed the available bitrate, R.

In another exemplary embodiment, an input AV bitstream (e.g., an input AV bitstream generated by source 10 of FIG. 1) is indicative of an audio/video program, and includes adaptation points which occur a first rate (e.g., the adaptation points are determined by occurrence, once every 100 milliseconds, of a video I-frame and a corresponding audio I-frame of the input AV bitstream). Since the adaptation points are available times at which playback of the program may begin, they correspond to "tune-in" times (rewind/fast forward points) which a consumer might select (e.g., by operating playback device 16 of FIG. 1) in order to begin playback of the program. If generation of the AV bitstream is subject to the constraint (e.g., as indicated by bits delivered to NBMP entity 12 of FIG. 1, from NBMP 14 or playback device 16 of FIG. 1) that the generated AV bitstream comprises adaptation points (tune-in times) which occur at a predetermined rate (e.g., once every 50 milliseconds) greater than the first rate (i.e., so that the generated AV bitstream has more adaptation points than the input AV bitstream) or predetermined rate (e.g., once every 200 milliseconds) less than the first rate (i.e., so that the generated AV bitstream has fewer adaptation points than the input AV bitstream), an embodiment of the inventive method is performed (e.g., by operation of NBMP entity 12 of FIG. 1) to generate the AV bitstream in response to the input AV bitstream subject to such constraint. For example, if adaptation points occur in the input AV bitstream once every 100 milliseconds (i.e., a video I-frame and a corresponding audio I-frame of the input AV bitstream occur once every 100 milliseconds), in order to increase the rate at which adaptation points occur in the generated AV bitstream, video P-frames and audio P-frames of the input AV bitstream are re-authored as video I-frames and audio I-frames, and the re-authored I-frames are included in the generated AV bitstream in place of the P-frames, such that adaptation points occur in the generated AV bitstream more than once every 100 milliseconds (i.e., with at least one such adaptation point occurring at a time corresponding to a re-authored video I-frame and a corresponding re-authored audio I-frame).

Each of units 3 and 7 of FIG. 3, unit 3 of FIG. 4, and NBMP entity 12 and playback device 16 of FIG. 1 may be implemented as a hardware system configured, or as a processor programmed with software or firmware (or otherwise configured), to perform an embodiment of the inventive method.

Typically, unit 3 of FIG. 3 includes at least one buffer 3A, unit 3' of FIG. 3 includes at least one buffer 3A', splicer 7 of FIG. 3 includes at least one buffer (7A and/or 7D), and each of NBMP entity 12 and playback device 16 of FIG. 1 includes at least one buffer. Typically, each of such buffers (e.g., buffers 3A, 3A', 7A, and 7D, and the buffers of entity 12 and device 16) is a buffer memory coupled to receive a sequence of packets of a AV bitstream generated by (or provided to) the device including the buffer memory, and in operation the buffer memory stores (e.g., in a non-transitory manner) at least one segment of the AV bitstream. In typical operation of unit 3 (or 3'), a sequence of segments of the AV bitstream is asserted from buffer 3A to delivery subsystem 5 (or from buffer 3A' to delivery subsystem 5'. In typical operation of splicer 7, a sequence of segments of an AV bitstream to be spliced is asserted from buffer 7A to parsing subsystem 7B of splicer 7, and from buffer 7D to parsing subsystem 7E of splicer 7.

Unit 3 of FIG. 3 (of FIG. 4), and/or splicer 7 of FIG. 3, and/or NBMP entity 12 and/or device 16 of FIG. 1 (or any component or element thereof) may be implemented as one or more processes and/or one or more circuits (e.g., ASICs, FPGAs, or other integrated circuits), in hardware, software, or a combination of hardware and software.

Some embodiments of the invention relates to a processing unit (AVPU) configured to perform any embodiment of the inventive method for generation or adaptation (e.g., splicing or switching) of an AV bitstream. For example, the AVPU may be an NBMP entity (e.g., NBMP entity 12 of FIG. 1) or a production unit or audio encoder (e.g., unit 3 of FIG. 3 or FIG. 4). For another example, the AVPU (e.g., an NBMP entity) may be an adapter (e.g., a splicer) configured to perform any embodiment of the inventive AV bitstream adaptation method (e.g., an appropriately configured embodiment of splicer 7 of FIG. 3). In another class of embodiments of the invention the AVPU (e.g., unit 3 or splicer 7 of FIG. 3) includes at least one buffer memory (e.g., buffer 3A in unit 3 of FIG. 3, or buffer 7A or 7D of splicer 7 of FIG. 3, or a buffer memory in source 10, or NBMP entity 12, or device 16 of FIG. 1) which stores (e.g., in a non-transitory manner) at least one segment of a AV bitstream which has been generated by any embodiment of the inventive method. Examples of AVPUs include, but are not limited to encoders (e.g., transcoders), NBMP entities (e.g., NBMP entities configured to generate and/or perform adaptation on an AV bitstream), decoders (e.g., decoders configured to decode content of an AV bitstream, and/or to perform adaptation (e.g., splicing) on an AV bitstream to generate an adapted (e.g., spliced) AV bitstream and to decode content of the adapted AV bitstream), codecs, AV bitstream adapters (e.g., splicers), pre-processing systems (pre-processors), post-processing systems (post-processors), AV bitstream processing systems, and combinations of such elements.

An embodiment of the invention relates to a system or device configured (e.g., programmed) to perform any embodiment of the inventive method, and a computer readable medium (e.g., a disc) which stores code (e.g., in a non-transitory manner) for implementing any embodiment of the inventive method or steps thereof. For example, the inventive system can be or include a programmable general purpose processor, digital signal processor, or microprocessor, programmed with software or firmware and/or otherwise configured to perform any of a variety of operations on data, including an embodiment of the inventive method or steps thereof. Such a general purpose processor may be or include a computer system including an input device, a memory, and processing circuitry programmed (and/or otherwise configured) to perform an embodiment of the inventive method (or steps thereof) in response to data asserted thereto.

In some embodiments, the inventive apparatus is an audio encoder (e.g., an AC-4 encoder) configured to perform an embodiment of the inventive method. In some embodiments, the inventive apparatus is an NBMP entity (e.g., an MPEG NBMP entity, which may be or may be included in a CDN Server) programmed or otherwise configured to perform an embodiment of the inventive method (e.g., to insert I-frames in or remove I-Frames from a transport stream, optionally in a manner depending on network and/or other constraints).

Embodiments of the present invention may be implemented in hardware, firmware, or software, or a combination thereof (e.g., as a programmable logic array). For example, unit 3 and/or splicer 7 of FIG. 3, or bitstream source 10 and/or NBMP entity 12 of FIG. 1, may be implemented in appropriately programmed (or otherwise configured) hardware or firmware, e.g., as a programmed general purpose processor, digital signal processor, or microprocessor. Unless otherwise specified, the algorithms or processes included as part of the embodiments of the invention are not inherently related to any particular computer or other apparatus. In particular, various general-purpose machines may be used with programs written in accordance with the teachings herein, or it may be more convenient to construct more specialized apparatus (e.g., integrated circuits) to perform the required method steps. Thus, the embodiments of the invention may be implemented in one or more computer programs executing on one or more programmable computer systems (e.g., an implementation of all or some of elements of unit 3 and/or splicer 7 of FIG. 3, or source 10 and/or NBMP entity 12 of FIG. 1), each comprising at least one processor, at least one data storage system (including volatile and non-volatile memory and/or storage elements), at least one input device or port, and at least one output device or port. Program code is applied to input data to perform the functions described herein and generate output information. The output information is applied to one or more output devices, in known fashion.

Each such program may be implemented in any desired computer language (including machine, assembly, or high level procedural, logical, or object oriented programming languages) to communicate with a computer system. In any case, the language may be a compiled or interpreted language.

For example, when implemented by computer software instruction sequences, various functions and steps of embodiments of the invention may be implemented by multithreaded software instruction sequences running in suitable digital signal processing hardware, in which case the various devices, steps, and functions of the embodiments may correspond to portions of the software instructions.

Each such computer program is preferably stored on or downloaded to a storage media or device (e.g., solid state memory or media, or magnetic or optical media) readable by a general or special purpose programmable computer, for configuring and operating the computer when the storage media or device is read by the computer system to perform the procedures described herein. The inventive system may also be implemented as a computer-readable storage medium, configured with (i.e., storing) a computer program, where the storage medium so configured causes a computer system to operate in a specific and predefined manner to perform the functions described herein.

Exemplary embodiments of the invention include the following:

E1. A method for generating an AV bitstream, including steps of:

providing frames indicative of content, including frames of a first decoding type, where each of the frames is indicative of audio content or video content; and generating an AV bitstream, including by re-authoring at least one of the frames of the first decoding type as a re-authored frame of a second decoding type different than the first decoding type, such that the AV bitstream includes a segment of the content which includes the re-authored frame, and the segment of the content starts with an I-frame and includes at least one P-frame following the I-frame, wherein the re-authored frame is a re-authored I-frame if said one of the frames of the first decoding type is a P-frame, or the re-authored frame is a re-authored P-frame if said one of the frames of the first decoding type is an I-frame.

E2. The method of E1, wherein the step of providing frames includes steps of:

in a first system, generating an input AV bitstream which includes the frames; and delivering the input AV bitstream to a second system, and wherein the step of generating the AV bitstream is performed in the second system.

E3. The method of E2, wherein the second system is a Network-Based Media Processing (NBMP) entity.

E4. The method of any of E1-E3, wherein the re-authored frame is an audio I-frame, said one of the frames of the first decoding type is an audio P-frame including metadata, and the step of re-authoring includes replacing at least some of the metadata of the audio P-frame with different metadata copied from a prior audio I-frame, so that the re-authored frame includes said different metadata.

E5. The method of any of E1-E3, wherein the re-authored frame is an audio I-frame, said one of the frames of the first decoding type is an audio P-frame including metadata, and the step of re-authoring includes steps of:

generating modified metadata, by modifying metadata from a prior audio I-frame; and replacing at least some of the metadata of the audio P-frame with the modified metadata, so that the re-authored frame includes said modified metadata.

E6. The method of any of E1-E3, wherein the re-authored frame is an audio I-frame, said one of the frames of the first decoding type is an audio P-frame, and the step of re-authoring includes copying at least one prior P-frame into the audio P-frame.

E7. The method of any of E1-E6, wherein the step of providing frames includes a step of generating audio I-frames and audio P-frames indicative of encoded audio content, the step of re-authoring includes a step of re-authoring at least one of the audio P-frames as a re-authored audio I-frame, and the segment of the content of the AV bitstream is a segment of the encoded audio content which starts with the re-authored audio I-frame.

E8. The method of E7, wherein the step of generating the audio I-frames and the audio P-frames and the step of generating the AV bitstream are performed in an audio encoder.

E9. The method of E7 or E8, wherein the step of providing frames includes steps of:

in a first system, generating an input AV bitstream which includes the audio I-frames and the audio P-frames; and delivering the input AV bitstream to a second system, and wherein the step of generating the AV bitstream is performed in the second system.

E10. The method of E9, wherein the second system is a Network-Based Media Processing (NBMP) entity.

E11. The method of any of E1-E10, wherein the step of providing frames includes a step of generating audio I-frames indicative of encoded audio content, the step of re-authoring includes a step of re-authoring at least one of the audio I-frames as a re-authored audio P-frame, and the segment of the content of the AV bitstream is a segment of the encoded audio content which starts with one of the audio I-frames and includes the re-authored audio P-frame.

E12. The method of E11, wherein the step of generating the audio I-frames and the step of generating the AV bitstream are performed in an audio encoder.

E13. The method of E11 or E12, wherein the step of providing frames includes steps of:

in a first system, generating an input AV bitstream which includes the audio I-frames; and delivering the input AV bitstream to a second system, and wherein the step of generating the AV bitstream is performed in the second system.

E14. The method of E13, wherein the second system is a Network-Based Media Processing (NBMP) entity.

E15. The method of any of E1-E14, wherein the step of generating the AV bitstream is performed so that said AV bitstream satisfies at least one network constraint.

E16. The method of E15, wherein the network constraint is available bitrate of the AV bitstream, or maximum time to tune in to a program, or maximum allowed segment duration of the AV bitstream.

E17. The method of any of E1-E16, wherein the step of generating the AV bitstream is performed so that said AV bitstream satisfies at least one constraint, where the constraint is that the AV bitstream comprises adaptation points which occur at a predetermined rate, and where each of the adaptation points is a time of occurrence of both a video I-frame of the AV bitstream and at least one corresponding audio I-frame of the AV bitstream.

E18. The method of any of E1-E17, wherein the AV bitstream is an MPEG-2 transport stream or is based on ISO Base Media format.

E19. The method of E18, wherein each of the frames indicative of audio content includes encoded audio data having AC-4 format.

E20. A method of adapting (e.g., splicing or switching) an AV bitstream, thereby generating an adapted (e.g., spliced) AV bitstream, where the AV bitstream has been generated by the method of E1.

E21. The method of E20, wherein the AV bitstream has an adaptation point at which the I-frame of the segment of content is aligned with an I-frame of a segment of corresponding content of the AV bitstream, and the AV bitstream is adapted (e.g., spliced) at the adaptation point.

E22. A system for generating an AV bitstream, said system including:

at least one input coupled to receive frames indicative of content, including frames of a first decoding type, where each of the frames is indicative of audio content or video content; and a subsystem, coupled and configured to generate the AV bitstream, including by re-authoring at least one of the frames of the first decoding type as a re-authored frame of a second decoding type different than the first decoding type, such that the AV bitstream includes a segment of the content which includes the re-authored frame, and the segment of the content starts with an I-frame and includes at least one P-frame following the I-frame, wherein the re-authored frame is a re-authored I-frame if said one of the frames of the first decoding type is a P-frame, or the re-authored frame is a re-authored P-frame if said one of the frames of the first decoding type is an I-frame.

E23. The system of E22, wherein said frames indicative of the content are included in an input AV bitstream which has been delivered to said system.

E24. The system of E22 or E23, wherein said system is a Network-Based Media Processing (NBMP) entity.

E25. The system of any of E22-E24, wherein the re-authored frame is an audio I-frame, said one of the frames of the first decoding type is an audio P-frame including metadata, and the subsystem is configured to perform the re-authoring including by replacing at least some of the metadata of the audio P-frame with different metadata copied from a prior audio I-frame, so that the re-authored frame includes said different metadata.

E26. The system of any of E22-E24, wherein the re-authored frame is an audio I-frame, said one of the frames of the first decoding type is an audio P-frame including metadata, and the subsystem is configured to perform the re-authoring including by:

generating modified metadata, by modifying metadata from a prior audio I-frame; and replacing at least some of the metadata of the audio P-frame with the modified metadata, so that the re-authored frame includes said modified metadata.

E27. The system of any of E22-E24, wherein the re-authored frame is an audio I-frame, said one of the frames of the first decoding type is an audio P-frame, and the subsystem is configured to perform the re-authoring including by copying at least one prior P-frame into the audio P-frame.

E28. The system of any of E22-E27, wherein the subsystem is configured to generate the AV bitstream such that said AV bitstream satisfies at least one network constraint.

E29. The system of E28, wherein the network constraint is available bitrate of the AV bitstream, or maximum time to tune in to a program, or maximum allowed segment duration of the AV bitstream.

E30. The system of any of E22-E27, wherein the subsystem is configured to generate the AV bitstream such that said AV bitstream satisfies at least one constraint, where the constraint is that the AV bitstream comprises adaptation points which occur at a predetermined rate, and where each of the adaptation points is a time of occurrence of both a video I-frame of the AV bitstream and at least one corresponding audio I-frame of the AV bitstream.

E31. A method for generating an AV bitstream, including steps of:

(a) providing frames, where at least one of the frames is a hybrid frame including a P-frame and an I-frame, where the I-frame is indicative of an encoded version of content and the P-frame is indicative of a differently encoded version of the content, and where each of the frames is indicative of audio content or video content; and (b) generating an AV bitstream, including by selecting the P-frame of at least one said hybrid frame, and including each selected P-frame in the AV bitstream, such that the AV bitstream includes a segment which starts with an I-frame and includes at least said selected P-frame following the I-frame.

E32. The method of E31, wherein step (a) includes generation of a first sequence of I-frames indicative of an encoded version of content and a second sequence of P-frames indicative of a differently encoded version of the content, and wherein at least one said hybrid frame includes one of the I-frames of the first sequence and one of the P-frames of the second sequence.

E33. A system for AV bitstream adaptation (e.g., splicing or switching), including:

at least one input coupled to receive an AV bitstream, where the AV bitstream has been generated by the method of E1-E21, E31 or E32; and a subsystem coupled and configured to adapt (e.g., splice or switch) the AV bitstream, thereby generating an adapted AV bitstream.

E34. An audio/video processing unit, including:

a buffer memory; and at least one audio/video processing subsystem coupled to the buffer memory, wherein the buffer memory stores in a non-transitory manner at least one segment of an AV bitstream, wherein the AV bitstream has been generated by the method of any of E1-E21, E31 or E32.

E35. The unit of E34, wherein the audio/video processing subsystem is configured to generate the AV bitstream.

E36. Computer program product having instructions which, when executed by a processing device or system, cause said processing device or system to perform the method of any of E1-E21, E31 or E32.

A number of embodiments of the invention have been described. It should be understood that various modifications may be contemplated. Numerous modifications and variations of the present embodiments of the invention are possible in light of the above teachings. It is to be understood that within the scope of the appended claims, any embodiment of the invention may be practiced otherwise.

The invention claimed is:

1. A method for generating an output audio/video bitstream, including steps of:

(a) providing frames, where at least one of the frames is a hybrid frame including a P-frame and an I-frame, where the I-frame is indicative of an encoded version of content and the P-frame is indicative of a differently encoded version of the content, and where each of the frames is indicative of audio content or video content; and (b) generating the output audio/video bitstream, including by selecting the P-frame of at least one said hybrid frame, and including each selected P-frame in the output audio/video bitstream, such that the output audio/video bitstream includes a segment which starts with an I-frame and includes at least said selected P-frame following the I-frame.

2. A method for generating an output audio/video bitstream, including steps of:
(a) providing frames, where at least one of the frames is a hybrid frame including at least one chunk of data useful for determining a P-frame and an I-frame, where the I-frame is indicative of an encoded version of content and the P-frame is indicative of a differently encoded version of the content, and where each of the frames is indicative of audio content or video content; and
(b) generating the output audio/video bitstream, including by synthesizing at least one I-frame or P-frame using at least one said chunk of data of at least one said hybrid frame, thereby generating at least one synthesized frame, and including each said synthesized frame in the output audio/video bitstream, such that the output audio/video bitstream includes a segment which starts with an I-frame and includes at least one synthesized P-frame following the I-frame, or starts with a synthesized I-frame and includes at least one P-frame following the synthesized I-frame.

\* \* \* \* \*